United States Patent
Sonoda et al.

(10) Patent No.: US 8,980,432 B2
(45) Date of Patent: Mar. 17, 2015

(54) MULTILAYER FILM AND MOLDED BODY

(75) Inventors: Kazumori Sonoda, Otsu (JP); Syunichi Osada, Otsu (JP); Takashi Mimura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 85 days.

(21) Appl. No.: 13/643,450

(22) PCT Filed: Apr. 15, 2011

(86) PCT No.: PCT/JP2011/059368
§ 371 (c)(1),
(2), (4) Date: Oct. 25, 2012

(87) PCT Pub. No.: WO2011/136042
PCT Pub. Date: Nov. 3, 2011

(65) Prior Publication Data
US 2013/0040133 A1  Feb. 14, 2013

(30) Foreign Application Priority Data

Apr. 27, 2010 (JP) .................... 2010-101880
Nov. 10, 2010 (JP) .................... 2010-251551

(51) Int. Cl.
| | | |
|---|---|---|
| B32B 27/40 | (2006.01) | |
| C08L 75/04 | (2006.01) | |
| C08L 83/04 | (2006.01) | |
| C08G 18/61 | (2006.01) | |
| B32B 27/08 | (2006.01) | |
| B32B 27/36 | (2006.01) | |
| C08J 7/04 | (2006.01) | |

(52) U.S. Cl.
CPC ............ B32B 27/08 (2013.01); B32B 27/36 (2013.01); C08J 7/042 (2013.01); C08J 2475/04 (2013.01); C08J 2483/02 (2013.01); Y10T 428/265 (2015.01)
USPC ........ 428/423.7; 428/430; 428/447; 428/480; 528/33; 528/85; 528/367

(58) Field of Classification Search
USPC .......... 428/423.7, 430, 447, 480; 528/33, 85, 528/367
See application file for complete search history.

(56) References Cited

U.S. PATENT DOCUMENTS

| | | | | |
|---|---|---|---|---|
| 5,024,893 | A | * | 6/1991 | Hanada et al. ............. 428/32.66 |
| 5,422,189 | A | * | 6/1995 | Warner et al. ................ 428/480 |
| 5,932,320 | A | * | 8/1999 | Okajima et al. ........... 428/195.1 |
| 6,130,278 | A | * | 10/2000 | Hibiya et al. ................. 524/322 |
| 2010/0239868 | A1 | * | 9/2010 | Takada et al. ............. 428/423.1 |

FOREIGN PATENT DOCUMENTS

| | | |
|---|---|---|
| JP | 63-037930 A | 2/1988 |
| JP | 01-075571 A | 3/1989 |
| JP | 07-117202 A | 5/1995 |
| JP | 11-228905 A | 8/1999 |
| JP | 2006-119772 A | 5/2006 |
| JP | 2006-137780 A | 6/2006 |
| JP | 2007-002260 A | 1/2007 |
| JP | 2007-056268 A | 3/2007 |
| WO | WO2007/069765 A1 | 6/2007 |

OTHER PUBLICATIONS

International Search Report dated Jul. 12, 2011, application No. PCT/JP2011/059368.

* cited by examiner

Primary Examiner — Thao T. Tran
(74) Attorney, Agent, or Firm — RatnerPrestia

(57) ABSTRACT

A first multilayer film is a multilayer film which contains a layer A on at least one surface of a base film, in which the layer A has (1) a polycaprolactone segment, (2) a polysiloxane segment and/or a polydimethyl siloxane segment, and (3) a urethane bond, and the layer A has a glass transition temperature of from −30 to 0° C. A second multilayer film contains a layer A on at least one surface of a base film, in which the layer A has a scratch recovery time of 3 seconds or less at a temperature of 10° C. A third multilayer film contains a layer B on at least one surface of a base film, in which the layer B has a polycaprolactone segment and a urethane bond, and the layer B has average elongation at break of 65% or more at 80° C. to 150° C.

4 Claims, No Drawings

MULTILAYER FILM AND MOLDED BODY

CROSS REFERENCE TO RELATED APPLICATIONS

This application is the U.S. National Phase application of PCT International Application No. PCT/JP2011/059368, filed Apr. 15, 2011, and claims priority to Japanese Patent Application Nos. 2010-101880, filed Apr. 27, 2010, and 2010-251551, filed Nov. 10, 2010, the disclosures of each of which are incorporated herein by reference in their entireties for all purposes.

FIELD OF THE INVENTION

The present invention relates to a multilayer film. In particular, the present invention relates to a multilayer film which has, as a molding material, excellent conformability during molding and scratch resistance and is also advantageous in terms of productivity and cost.

BACKGROUND OF THE INVENTION

On a material for molding like decorated molding, a surface hardening layer is formed to prevent a scratch during molding or a scratch during the use of a product after molding. However, since the surface hardening layer has insufficient elongation which conforms to molding, a crack is generated during molding. In an extreme case, the film is broken and the surface hardening layer is peeled off. For such reasons, a means like forming a surface hardening layer after molding or performing full hardening by heating or irradiating with active rays after molding under a semi-hardened state is employed.

Since the product after molding is processed to have a three-dimensional shape, it is extremely difficult to form a surface hardening layer by a post-processing. Further, when molding is carried out in a semi-hardened state, contamination of a mold may be caused depending on molding conditions. Thus, as an anti-abrasion material having conformability to molding, a "self-healing material", which can prevent a scratch according to hardness increase and also restore a minor scratch resistance, is recently getting an attention. The self-healing material can restore own deformation, that is within a range of elastic recovery by itself, and two major types including a thermocuring type and an active energy ray curing type using UV ray or electronic ray are known.

The self-healing material of an active energy ray curing type that is disclosed in Patent Literatures 1 and 2 has high surface hardness. However, as having small elongation, it is not suitable for use in molding involved with high molding magnification ratio.

The self-healing material of a thermocuring type that is disclosed in Patent Literatures 3 and 4 have a poor self-healing property at low temperature, and depending on environmental temperature, it may have residual scratches. Further, when molding magnification ratio is high, the layer consisting of a self-healing material (that is, self-healing layer) becomes thin so that the self-healing property is lowered. As such, a self-healing material maintaining a high self-healing property even when the film thickness is thin is waited for.

PATENT LITERATURE

Patent Literature 1: Japanese Patent Application Laid-Open (JP-A) No. 2006-137780
Patent Literature 2: JP-A No. 2006-119772
Patent Literature 3: JP-A No. 11-228905
Patent Literature 4: JP-A No. 2007-2260

SUMMARY OF THE INVENTION

The invention provides a multilayer film having a self-healing layer which has excellent conformability or self-healing property during molding, an excellent self-healing property at low temperature, may be formed in a thin film, and has an advantage in terms of cost.

A first multilayer film according to the present invention is a multilayer film including a layer A on at least one surface of a base film, wherein the layer A has (1) a polycaprolactone segment, (2) a polysiloxane segment and/or a polydimethyl siloxane segment, and (3) a urethane bond, and the layer A has a glass transition temperature of from −30 to 0° C.

A second multilayer film according to the present invention is a multilayer film including a layer A on at least one surface of a base film, wherein the layer A has (1) a polycaprolactone segment, (2) a polysiloxane segment and/or a polydimethyl siloxane segment, and (3) a urethane bond, and the layer A has a scratch recovery time of 3 seconds or less at a temperature of 10° C.

A third multilayer film according to the present invention is a multilayer film including a layer B on at least one surface of a base film, wherein the layer B has a polycaprolactone segment and a urethane bond, and the layer B has average elongation at break of 65% or more at 80° C. to 150° C.

The multilayer film of the invention has excellent conformability to molding processing by heating and an ability of restoring surface scratch (that is, self-healing property). The multilayer film of the invention is particularly effective for a resin film which easily suffers from an occurrence of a surface scratch.

DETAILED DESCRIPTION OF EMBODIMENTS OF THE INVENTION

Herein below, the invention is explained in greater detail with reference to exemplary embodiments.

<Base Film>

The resin for constituting a base film of the invention may be any one of a thermoplastic resin and a thermosetting resin, and also it may be a homoresin, a copolymer resin or a blend of two or more kinds. More preferably, the resin for constituting a base film is a thermoplastic resin due to good moldability.

Examples of the thermoplastic resin include polyolefin resins such as polyethylene, polypropylene, polystyrene, or polymethylpentene, alicyclic polyolefin resins, polyamide resins such as nylon 6 or nylon 66, aramid resins, polyester resins, polycarbonate resins, polyarylate resins, polyacetal resins, polyphenylene sulfide resins, fluorine resins such as ethylene tetrafluoride resin, ethylene trifluoride resin, ethylene trifluoride chloride resin, ethylene tetrafluoride-propylene hexafluoride copolymer and vinylidene fluoride resin, acryl resins, methacryl resins, polyacetal resins, polyglycolic acid resins and polylactic acid resins. As a thermoplastic resin, a resin having both sufficient elongation property and conformability is preferable. Among them, from the view point of strength, heat resistance and transparency, the polyester resin is particularly preferable.

In the invention, the polyester resin is a general name of a polymer in which an ester bond is a major bonding chain in main skeleton, and the polymer is obtained by polycondensation of an acid component and an ester thereof and a diol component. Specific examples thereof include polyethylene terephthalate, polypropylene terephthalate, polyethylene-2,6-naphthalate, and polybutylene terephthalate. Further, a copolymer obtained by copolymerization with them and other dicarboxylic acid and an ester or a diol component as an acid component or a diol component may be also used. Among them, from the view point of transparency, dimension stability, and heat resistance or the like, polyethylene terephthalate and polyethylene-2,6-naphthalate are particularly preferable.

Further, in the resin, various additives may be added, for example, an antioxidant, an antistatic agent, a crystalline nucleating agent, an inorganic particle, an organic particle, a viscosity reducing agent, a heat stabilizer, a lubricant, an infrared absorbing agent, an ultraviolet absorbing agent, and a doping agent for adjusting refractive index.

The base film may be any one of a base film with monolayer constitution and a base film with multilayer constitution.

<Polyester Base Film>

According to the invention, when a resin for constituting abase film contains a polyester resin in an amount of 50% by mass or more and 100% by mass or less per entire components of a base film, which is 100%, such base film is referred to as a polyester base film.

With respect to the polyester resin for constituting the polyester base film of the invention, the intrinsic viscosity of the polyester is preferably in the range of 0.4 to 1.2 dl/g, and more preferably 0.5 to 0.8 dl/g (as measured in o-chlorophenol at 25° C. according to JIS K 7367 (2000)).

As a polyester base film, any one of a non-stretched (non-oriented) film, a monoaxially stretched (monoaxially oriented) film, and a biaxially stretched (biaxially oriented) film may be used. However, a biaxially stretched film having excellent dimension stability or heat resistance is preferably used. It is preferable that the biaxially stretched film has high crystal orientation. According to the invention, a biaxially oriented film refers to a film that shows a biaxially oriented pattern in wide angle X-ray diffraction observation.

The polyester base film may be a polyester film having fine cavities within it.

The polyester base film may have a monolayer constitution or a multilayer constitution.

For a polyester base film having a multilayer constitution, different polyester resins, preferably a layer containing polyester resin C in an amount of from 50% by mass to 100% by mass (layer C) and a layer containing polyester resin D in an amount of from 50% by mass to 100% by mass (layer D) are laminated. When the polyester base film has a multilayer constitution, the expression "different polyester resins" as used herein includes not only polyester resins having a different molecular structure but also polyester resins in which only part of a copolymerized polyester resin is different.

For a polyester base film having a multilayer constitution, it is more preferable that a layer containing polyester resin C in an amount of from 50% by mass to 100% by mass (layer C) and a layer containing polyester resin D in an amount of from 50% by mass to 100% by mass (layer D), in which the polyester resin D is different from the polyester resin C, are laminated. It is still more preferable that a layer containing polyester resin C in an amount of from 50% by mass to 100% by mass (layer C) and a layer containing polyester resin D in an amount of from 50% by mass to 100% by mass (layer D), in which the polyester resin D is different from the polyester resin C, are laminated alternately to have 50 layers or more for each. The number of laminated layers is more preferably 200 layers or more. The upper limit of the number of laminated layers is preferably 1500 layers or less considering wave selectivity decrease which is accompanied with accuracy decrease caused by having a large size device or excessive number of layers. According to an aspect of the invention, by having a polyester base film with a multilayer laminate structure, an interference color, or further a metallic color, is obtained, and therefore desirable.

It is preferable that the polyester resin C is polyethylene terephthalate or polyethylene naphthalate, and the polyester resin D is a polyester containing spiroglycol. The polyester containing spiroglycol means a copolyester copolymerized with spiroglycol (that is, part of the glycol component in polyester is transformed into a spiroglycol), or a homopolyester (that is, all of the glycol component in polyester is transformed into a spiroglycol), or a polyester in which they are blended. Since the polyester containing spiroglycol has a small difference of glass transition temperature from polyethylene terephthalate or polyethylene naphthalate, it is preferable in that over-stretching does not tend to take place during molding and interlayer delamination does not tend to take place as well.

More preferably, the polyester resin C is polyethylene terephthalate or polyethylene naphthalate, and the polyester resin D is a polyester containing spiroglycol and cyclohexane dicarboxylic acid. The polyester resin D containing spiroglycol and cyclohexane dicarboxylic acid means a copolyester copolymerized with spiroglycol and cyclohexane dicarboxylic acid (or an ester derivative of cyclohexane dicarboxylic acid), or a homopolyester (that is, all of the glycol component is spiroglycol and all of the carboxylic acid components is cyclohexane dicarboxylic acid), or a polyester in which they are blended. When the polyester resin D is a polyester containing spiroglycol and cyclohexane dicarboxylic acid, a high reflectance is easily obtained because it has a large difference of in-plane refractive indexes from polyethylene terephthalate or polyethylene naphthalate. Further, it has a small difference of glass transition temperature from polyethylene terephthalate or polyethylene naphthalate so that over-stretching does not tend to take place during molding and interlayer delamination does not also tend to take place.

Further, it is preferable that the polyester resin C is polyethylene terephthalate or polyethylene naphthalate, and the polyester resin D is a polyester containing cyclohexane dimethanol. The polyester containing cyclohexane dimethanol means a copolyester copolymerized with cyclohexane dimethanol, or a homopolyester (that is, homopolyester in which all of the glycol component is cyclohexane dimethanol), or a polyester in which they are blended. The polyester containing cyclohexane dimethanol has a small difference of glass transition temperature from polyethylene terephthalate or polyethylene naphthalate, thus it is preferable because over-stretching does not tend to take place during molding and interlayer delamination does not tend to take place as well.

More preferably, according to the invention, the polyester resin D is a polycondensate of ethylene terephthalate where the copolymerized amount of cyclohexane dimethanol is 15 mol % or more and 60 mol % or less. When the polyester resin D is a polycondensate of ethylene terephthalate where the copolymerized amount of cyclohexane dimethanol is 15 mol % or more and 60 mol or less, together with high reflective performance, the change of optical properties is small particularly in heating or with time, and the interlayer delamination does not also tend to take place. A polycondensate of ethylene terephthalate where the copolymerized amount of cyclohexane dimethanol is 15 mol % or more and 60 mol % or less adheres very strongly to polyethylene terephthalate. Further, there are cis and trans configurations in the cyclohexane dimethanol group as geometrical isomers, and also there are chair and boat forms as conformational isomers, thus orientational crystallization does not easily occur in co-stretching with polyethylene terephthalate, it has a high reflectance, the change of optical properties by thermal history is further small, and also break does not tend to take place in forming a film.

Further, an average in-plane refractive index of the polyester resin C layer is preferably higher than that of the polyester resin D layer relatively. Further, the difference between the average in-plane refractive index of the polyester resin C layer and the average in-plane refractive index of the layer D is preferably 0.01 or more. Further, thickness of a single layer is preferably 0.03 μm or more and 0.5 μm or less. More preferably, the difference between the average in-plane refractive index of the polyester resin C layer and the average in-plane refractive index of the polyester resin D layer is preferably 0.05 or more. Still more preferably, it is 0.1 or more. Further, when the difference between the average in-plane refractive index of the polyester resin C layer and the average in-plane refractive index of the layer D is 0.01 or more, the film exhibits excellent metallic color according to interference reflection. Further, when the difference between the average in-plane refractive index and the refractive index in the thickness direction of the layer C is 0.01 or more and the difference between the average in-plane refractive index and the refractive index in the thickness direction of the layer D is 0.01 or less, it is more preferable because decrease in the reflectance at a reflection peak does not occur even when an incident angle becomes large.

According to the invention, it is preferable that the difference of glass transition temperature between the polyester resin C and the polyester resin D is 20° C. or less. When the difference of glass transition temperature is 20° C. or less, thickness uniformity is obtained in forming a multilayer film, and thus no problem is caused even when a multilayer film is molded.

According to the invention, it is preferable that an absolute value of the difference of SP values between the polyester resin C and the polyester resin D is 1.0 or less. When an absolute value of the difference of SP values is 1.0 or less, interlayer delamination hardly occurs.

<Multilayer Film Having Layer A>

Herein below, a multilayer film having a layer A at least on one side of a base film is explained.

A first multilayer film of the invention is a multilayer film having the layer A at least on one side of a base film, in which the layer A contains (1) a polycaprolactone segment, (2) a polysiloxane segment and/or a polydimethylsiloxane segment, and (3) a urethane bond, and glass transition temperature of the layer A is between −30 and 0° C.

Further, a second multilayer film of the invention is a multilayer film having the layer A at least on one side of a base film, in which the layer A contains (1) a polycaprolactone segment, (2) a polysiloxane segment and/or a polydimethylsiloxane segment, and (3) a urethane bond, and scratch recovery time of the layer A at the temperature of 10° C. is the same or less than 3 seconds.

According to the first and second multilayer film of the invention, the layer A contains (1) a polycaprolactone segment, (2) a polysiloxane segment and/or a polydimethylsiloxane segment, and (3) a urethane bond.

Herein below, components that are included in the layer A are explained.

<Polycaprolactone Segment>

According to an embodiment of the invention, the layer A contains a polycaprolactone segment. As the layer A contains a polycaprolactone segment, an elasticity recovering property (that is, self-healing property) can be given to the layer A.

As used herein, the polycaprolactone segment indicates a segment represented by the following chemical formula.

[Chemical Formula 1]

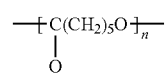

(n is an integer of from 1 to 35).

When the layer A is formed by using a composition containing a resin which includes a polycaprolactone segment, the layer A can have a polycaprolactone segment. The resin including a polycaprolactone segment preferably has at least one hydroxy group or more. The hydroxy group is preferably present at an end of a resin including a polycaprolactone segment.

When the layer A has a component including a polycaprolactone segment, the layer A can have a self-healing property. In other words, even when a scratch is formed on surface of the layer A, the scratch can be removed (that is, self-healed) within a short time like several seconds.

Preferred examples of the resin including a polycaprolactone segment include a polycaprolactone having 2 to 3 functional hydroxy groups. As a specific example, radical polymerizable polycaprolactone like the followings may be used:

polycaprolactone diol,

[Chemical Formula 2]

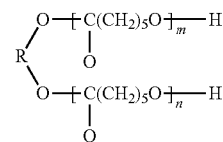

R: —C$_2$H$_4$—, —C$_2$H$_4$OC$_2$H$_4$—, —C(CH$_3$)$_2$(CH$_2$)$_2$—

(m represents an integer of from 1 to 34, n represents an integer of from 1 to 34, with the proviso that m+n is an integer of from 4 to 35. R represents —C$_2$H$_4$—, —C$_2$H$_4$OC$_2$H$_4$—, or —C(CH$_3$)$_2$(CH$_2$)$_2$—), polycaprolactone triol,

[Chemical Formula 3]

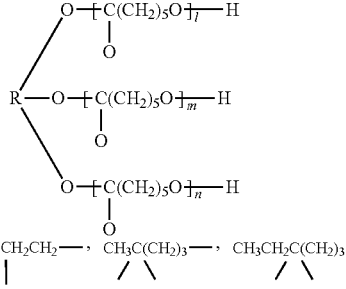

R: —CH$_2$CH$_2$CH$_2$—, CH$_3$C(CH$_2$)$_3$—, CH$_3$CH$_2$C(CH$_2$)$_3$—

(l represents an integer of from 1 to 28, m represents an integer of from 1 to 28, n represents an integer of from 1 to 28, with the proviso that l+m+n is an integer of from 3 to 30), or lactone modified hydroxyethyl (meth)acrylate

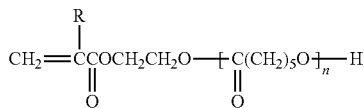
[Chemical Formula 4]

(R represents H or CH$_3$ and n represents an integer of from 1 to 25).

Further, according to the invention, the resin including a polycaprolactone segment may contain (or, be copolymerized with) a segment or a monomer which is different from the polycaprolactone segment. For example, a polydimethylsiloxane segment or a polysiloxane segment may be contained (or, copolymerized).

Further, according to the invention, weight average molecular weight of the polycaprolactone segment in the resin including a polycaprolactone segment is preferably 500 to 2,500. More preferably, the weight average molecular weight is 1,000 to 1,500. When the weight average molecular weight of the polycaprolactone segment is 500 to 2,500, the effect of a self-healing property is exhibited and scratch resistance is further improved.

For a case in which the polycaprolactone segment is copolymerized, or added separately, having the polycaprolactone segment in an amount of 5 to 50% by mass per 100% by mass of the entire components in the composition which is used for forming the layer A is preferable from the view point of the scratch restoring property and contamination resistance. As used herein, 100% by mass of the entire components in the composition does not include a solvent which is not involved with the reaction. Monomer component involved with the reaction is included therein.

<Polysiloxane Segment>

According to an embodiment of the invention, the layer A contains a polysiloxane segment and/or a polydimethylsiloxane segment. As used herein, the polysiloxane segment represents a segment represented by the following formula.

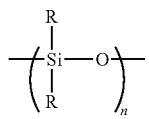
[Chemical Formula 5]

(R represents OH or an alkyl group having 1 to 8 carbon atoms and n represents an integer of from 3 to 100).

In order for the layer A to have a polysiloxane segment and/or a polydimethylsiloxane segment, the composition used for forming the layer A need to contain a resin including a polysiloxane segment.

According to the invention, a partial hydrolysate of a silane compound having a hydrolyzable silyl group, organosilica sol, or organosilica sol added with a hydrolyzable silane compound having a radical polymer can be used as the resin including a polysiloxane segment.

Examples of the resin including a polysiloxane segment include a total or partial hydrolysate of a silane compound having a hydrolyzable silyl group like tetraalkoxysilane, methyltrialkoxysilane, dimethyldialkoxysilane, γ-glycidoxypropyltrialkoxysilane, γ-glycidoxypropylalkyldialkoxysilane, γ-methacryloxypropyltrialkoxysilane, and γ-methacryloxypropylalkyldialkoxysilane, organosilica sol in which the silane compound is dispersed in an organic solvent, and organosilica sol of which surface is added with a hydrolyzable silane compound having a hydrolyzable silyl group.

Further, according to the invention, the resin including a polysiloxane segment may contain (or, be copolymerized with) a segment which is different from the polysiloxane segment. For example, a monomer compound having a polycaprolactone segment or a polydimethylsiloxane segment may be contained (or, copolymerized).

According to the invention, a copolymer of monomers having a hydroxy group which reacts with an isocyanate group is preferably used as a resin including a polysiloxane segment. When monomers having a hydroxy group which reacts with an isocyanate group are copolymerized with the resin including a polysiloxane segment, toughness of the layer A is improved.

When the resin including a polysiloxane segment is a copolymer containing a hydroxy group, by forming the layer A using a composition including a resin including a polysiloxane segment with a hydroxy group and a compound with an isocyanate group, the layer A having both polysiloxane segment and urethane bond can be prepared efficiently.

<Polydimethylsiloxane Segment>

According to an embodiment of the invention, the layer A contains a polysiloxane segment and/or a polydimethylsiloxane segment.

As used herein, the polydimethylsiloxane segment represents a segment represented by the following formula.

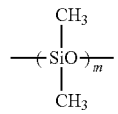
[Chemical Formula 6]

(m represents an integer of from 10 to 300).

When the layer A contains a polydimethylsiloxane segment, the polydimethylsiloxane segment is coordinated to the surface of the layer A. As a result of coordination of a polydimethylsiloxane segment to the surface of the layer A, a lubricating property of the surface of the layer A is enhanced so that the friction resistance can be lowered. As a result, a property of having a scratch can be inhibited.

In order for the layer A to have a polysiloxane segment and/or a polydimethylsiloxane segment, the composition used for forming the layer A needs to contain a resin including a polydimethylsiloxane segment. According to the invention, preferred examples of the resin including a polydimethylsiloxane segment include a copolymer obtained by copolymerizing a vinyl monomer with a polydimethylsiloxane segment.

Under the purpose of enhancing toughness of the layer A, in the resin including a polydimethylsiloxane segment, a monomer having a hydroxy group which reacts with an isocyanate group is preferably copolymerized. When the resin including a polydimethylsiloxane segment is a copolymer having a hydroxy group, by forming the layer A using a composition including a resin including a polydimethylsiloxane segment with a hydroxy group and a compound with an isocyanate group, the layer A having both polydimethylsiloxane segment and urethane bond can be prepared efficiently.

When the resin including a polydimethylsiloxane segment is a copolymer with a vinyl monomer, it may be any one of a block copolymer, a graft copolymer, and a random copolymer. When the resin including a polydimethylsiloxane segment is a copolymer with a vinyl monomer, it is referred to as a polydimethylsiloxane based copolymer. The polydimethylsiloxane based copolymer can be produced according to a living polymerization method, a polymer initiator method, or a polymer chain transfer method or the like. However, considering the productivity, the polymer initiation method and polymer chain transfer method are preferably used.

When the polymer initiator method is used, it may be copolymerized with other vinyl monomers by using a polymer azo based radiation polymerization initiator shown below.

[Chemical Formula 7]

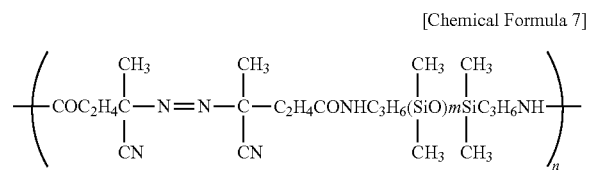

(m represents an integer of from 10 to 300 and n represents an integer of from 1 to 50)

Further, it is also possible to perform two-step polymerization including synthesizing a prepolymer having a peroxide group in the side chain by low temperature copolymerization of a peroxy monomer and polydimethylsiloxane having an unsaturated group and copolymerizing the prepolymer with a vinyl monomer.

When the polymer chain transfer method is used, a block copolymer can be synthesized by adding HS—CH$_2$COOH, HS—CH$_2$CH$_2$COOH, or the like to silicone oil shown below to give a compound having a SH group and copolymerizing the silicone compound and a vinyl monomer based on chain transfer of SH group.

[Chemical Formula 8]

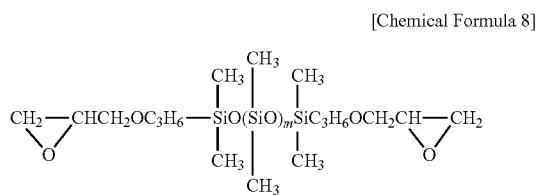

(m represents an integer of from 10 to 300)

For synthesis of polydimethylsiloxane based graft copolymer, a graft copolymer can be easily obtained by copolymerizing the compound shown below, that is, methacryl ester of polydimethylsiloxane, with a vinyl monomer.

[Chemical Formula 9]

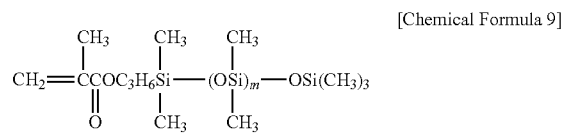

(m represents an integer of from 10 to 300)

Example of the vinyl monomer which is used for copolymerization with polydimethylsiloxane include methyl acrylate, ethyl acrylate, n-butyl acrylate, isobutyl acrylate, octylacrylate, cyclohexylacrylate, tetrahydrofurfuryl acrylate, methyl methacrylate, ethyl methacrylate, n-butyl methacrylate, isobutyl methacrylate, 2-ethylhexyl methacrylate, stearyl methacrylate, laurylmethacrylate, methylvinyl ether, ethylvinyl ether, n-propylvinyl ether, styrene, α-methylstyrene, acrylonitirile, methacrylonitrile, vinyl acetate, vinyl chloride, vinylidene chloride, vinyl fluoride, vinylidene fluoride, glycidyl acrylate, glycidyl methacrylate, allyl glycidyl ether, acrylic acid, methacrylic acid, itaconic acid, crotonic acid, maleic acid, maleic anhydride, acrylamide, methacrylamide, N-methylol acrylamide, N,N-dimethyl acrylamide, N,N-dimethylaminoethyl methacrylate, N,N-diethylaminoethyl methacrylate, diacetone acrylamide, 2-hydroxyethyl acrylate, 2-hydroxyethyl methacrylate, 2-hydroxypropyl acrylate, 2-hydroxypropyl methacrylate, and allyl alcohol.

Further, the polydimethylsiloxane based copolymer is preferably produced by solution polymerization method in a single solvent or a mixture solvent of an aromatic hydrocarbon solvent like toluene and xylene, a ketone solvent like methyl ethyl ketone and methyl isobutyl ketone, an ester solvent like ethyl acetate and butyl acetate, and an alcohol solvent like ethanol and isopropyl alcohol.

If necessary, a polymerization initiator like benzoyl peroxide and azobis isobutylnitrile is used in combination. The polymerization is preferably carried out for 3 to 12 hours at 50 to 150° C. In the present invention, the amount of the polydimethylsiloxane segment in the polydimethylsiloxane based copolymer is preferably 1 to 30% by mass per 100% by mass of the entire components of the polydimethylsiloxane based copolymer from the view point of a lubricating property or a contamination resistance of the layer A. Further, the weight average molecular weight of the polydimethylsiloxane segment is preferably from 1,000 to 30,000.

According to the invention, when the resin including a polydimethylsiloxane segment is used as a composition for forming the layer A, it may contain (or, be copolymerized with) a segment which is different from the polydimethylsiloxane segment. For example, a polycaprolactone segment or a polysiloxane segment may be contained (or, copolymerized).

For any case in which the polycaprolactone segment is copolymerized or added separately, the amount of the polysiloxane segment is preferably 1 to 20% by mass per 100% by mass of the entire components of the composition used for forming the layer A, from the view point of a scratch restoring property, contamination resistance, weather resistance, and heat resistance. As used herein, 100% by mass of the entire components in the composition does not include a solvent which is not involved with the reaction. Monomer component involved with the reaction is included therein.

As for the composition used for forming the layer A, a copolymer of a polycaprolactone segment and a polydimethylsiloxane segment, a copolymer of a polycaprolactone segment and a polysiloxane segment, and a copolymer of a polycaprolactone segment, a polydimethylsiloxane segment, and a polysiloxane segment can be used. The layer A obtained by using such composition can have a polycaprolactone segment and a polydimethylsiloxane segment and/or a polysiloxane segment.

With respect to the reaction between the polydimethylsiloxane based copolymer, polycaprolactone, and polysiloxane in the composition to obtain the layer A containing a polycaprolactone segment, a polysiloxane segment and a polydimethylsiloxane segment, copolymerization can be carried out by suitably adding a polycaprolactone segment and a polysiloxane segment during the synthesis of a polydimethylsiloxane based copolymer.

<Urethane Bond>

According to an embodiment of the invention, the layer A has a urethane bond.

When the composition used for forming the layer A contains a commercially available urethane modified resin, it becomes possible for the layer A to have a urethane bond.

Further, a urethane bond can be also included in the layer A by generating a urethane bond at the time of forming the layer A based on a reaction between an isocyanate group and a hydroxy group.

According to the invention, a urethane bond is included in the layer A preferably by generating a urethane bond based on a reaction between an isocyanate group and a hydroxy group. As a result of generating a urethane bond based on a reaction between an isocyanate group and a hydroxy group, not only the toughness of the layer A is improved but also the elasticity recovering property (self-healing property) of the layer A can be improved.

Further, when a resin including a polysiloxane segment or a resin including a polydimethylsiloxane segment has a hydroxy group, it is possible to generate a urethane bond between the resin described above and a compound having an isocyanate group by an action of heat or the like. When the layer A is formed by using a compound having an isocyanate group and the resin including a polysiloxane segment in which a hydroxy group is contained or the resin including polydimethylsiloxane segment in which a hydroxy group is contained, toughness and elasticity recovering property (self-healing property) of the layer A can be further improved, and therefore desirable.

According to the invention, the compound having an isocyanate group indicates a resin having an isocyanate group or a monomer or an oligomer containing an isocyanate group. Examples of the compound having an isocyanate group include polyisocyanate like a trimethylol propane adduct of methylenebis-4-cyclohexylisocyanate or tolylene diisocyanate, a trimethylol propane adduct of hexamethylene diisocyanate, a trimethylol propane adduct of isophorone diisocyanate, an isocyanurate form of tolylene diisocyanate, an isocyanurate form of hexamethylene diisocyanate, a biurete form of hexamethylene isocyanate, and a block form of the isocyanates.

Among the compounds having an isocyanate group, an aliphatic isocyanate is preferred compared to an alicyclic or aromatic isocyanate as it has a higher self-healing property. More preferred example of the compound having an isocyanate group is hexamethylene diisocyanate. Further, as a compound having an isocyanate group, isocyanate having an isocyanurate ring is particularly preferred from the view point of heat resistance. The isocyanurate form of hexamethylene diisocyanate is most preferred. The isocyanate having an isocyanurate ring forms the layer A having both the self-healing property and heat resistance.

The layer A of the invention is preferably formed according to the reaction caused by heat which induces formation of a urethane bond between an isocyanate group and a hydroxy group. When two or more isocyanate functional groups are present in the compound having an isocyanate group, more bondings to the compound having a hydroxy compound can be produced to improve physical properties, and therefore preferable.

According to an embodiment of the invention, for forming the layer A, the compound having an isocyanate group is contained in an amount of 11% by mass or more and 22% by mass or less per 100% by mass of the entire components of the composition. However, 100% by mass of the entire components in the composition does not include a solvent which is not involved with the reaction. Monomer component involved with the reaction is included therein.

In the composition for forming the layer A, other cross linking agent including a melamine cross linking agent like alkoxymethylol melamine, an acid anhydride cross linking agent like 3-methyl-hexahydrophthalic anhydride, and an amine cross linking agent like diethylaminopropylamine may be included. If necessary, a cross linking catalyst like dibutyl tin dilaurate and dibutyl tin diethyl hexoate may be also used for promoting the reaction for forming a urethane bond.

According to the invention, the layer A preferably contains a resin which includes all of a polycaprolactone segment, a polysiloxane segment and/or a polydimethylsiloxane segment, and a urethane bond. By having all of the polycaprolactone segment, polysiloxane segment and/or polydimethylsiloxane segment, and the urethane bond in one resin as a polymer, the layer A can become a layer with higher toughness, and therefore desirable.

By coating a composition containing at least three components of a polydimethylsiloxane based copolymer having a hydroxy group, polycaprolactone, and a compound having an isocyanate group on top of a base film and allowing the reaction to occur by heating, the layer A having the resin including all of the polycaprolactone segment, polydimethylsiloxane segment, and urethane bond can be obtained.

More preferably, the layer A has the resin including all of the polycaprolactone segment, polysiloxane segment and/or a polydimethylsiloxane segment, and a urethane bond in an amount of 80% by mass or more and 100% by mass or less per 100% by mass of the entire components for constituting the layer A. When the resin including all of the polycaprolactone segment, polysiloxane segment and/or a polydimethylsiloxane segment, and urethane bond is included in an amount of 80% by mass to 100% by mass per 100% by mass of the entire components for constituting the layer A, the self-healing property is improved.

<Other Components of Layer A>

The layer A of the invention may also contain other components like an acryl segment, a polyolefin segment, and a polyester segment.

The polyolefin segment indicates a polymer consisting of a repeating unit which is derived from an olefin having 2 to 20 carbon atoms with a structure equivalent to polyolefin resin.

The acryl segment is a polymer which includes an acryl unit as a constitutional component, and the acryl unit is preferably included in an amount of 50% by mol or more. Preferred examples include a methyl methacryl unit, a methyl acryl unit, an ethyl acryl unit, and a butyl acryl unit. By having an acryl segment in the layer A, a layer A with excellent chemical resistance and toughness can be provided.

As a diol component of the polyester segment, ethylene glycol, 1,3-propaine diol, neopentyl glycol, 2-methyl 1,3-propane dial, 1,4-cyclohexane dimethanol, polytetramethylene glycol, polyethylene glycol, polypropylene glycol, dimer diol and hydrogenated dimer diol can be used in addition to butane diol and/or hexane diol. As an acid component of the polyester segment, terephthalic acid, naphthalene dicarboxylic acid, isophthalic acid, sebacic acid, adipic acid, azelaic acid, succinic acid, and hexahydroterephthalic acid can be used. Further, two or more kinds of them may be also contained.

To the layer A, a heat resistant agent, a UV absorbing agent, a photostabilizing agent, organic or inorganic particles, pigments, and dyes, a releasing agent, or an anti-static agent may be also added.

<Glass Transition Temperature (Tg) of Layer A>

According to a first multilayer film of an embodiment of the invention, glass transition temperature of the layer A (Tg) is $-30$ to $0°$ C. The glass transition temperature of the layer A (Tg) is more preferably $-15$ to $-7°$ C.

When the glass transition temperature of the layer A is $-30$ to $0°$ C., the self-healing speed is greatly improved and also a multilayer film which maintains the self-healing property even at the low temperature range can be provided. When the glass transition temperature of the layer A is higher than 0° C., the self-healing property at the atmospheric temperature of 10° C. or less is extremely low. On the other hand, when the glass transition temperature of the layer A is lower than −30° C., the sliding property is deteriorated so that a problem like poor winding to a roll, a blocking, and poor molding is caused. When the glass transition temperature of the layer A is −15 to −7° C., the self-healing property at the atmospheric temperature of 5° C. is good, and thus it has favorable chemical resistance.

To have the glass transition temperature of the layer A in the range of −30 to 0° C., the compound having an isocyanate group is preferably contained in an amount of 11 to 22% by mass per 100% by mass of the entire components of the composition for forming the layer A.

As an another way of having glass transition temperature of the layer A in the range of −30 to 0° C., the layer A preferably contains a component having low glass transition temperature. In particular, the layer A preferably contains an acryl segment as a component having low glass transition temperature. The acryl segment as a component having low glass transition temperature is a segment consisting of a polymer which is obtained from a monomer like n-butyl acrylate, isobutyl acrylate, n-butyl methacrylate, and isobutyl methacrylate, for example. By increasing the content of the acryl segment as a component having low glass transition temperature in layer A, the glass transition temperature of the layer A can be controlled to be in the range of −30 to 0° C., and therefore desirable.

<Scratch Recovery Time of Layer A at Temperature of 10° C.>

According to the second multilayer film of the invention, the layer A has scratch recovery time at the temperature of 10° C. of 3 seconds or less. Preferably, the layer A has scratch recovery time at the temperature of 10° C. of 2 seconds or less. When the recovery time is 3 seconds or less, the self-healing speed is greatly improved, and therefore a film which maintains the self-healing property even at low temperature can be obtained. Further, when the recovery time is 2 seconds or less, decrease in the self-healing property is small even when molding magnification ratio is increased, and therefore desirable.

In order to for the layer A to have scratch recovery time at the temperature of 10° C. of 3 seconds or less, it is preferable that the glass transition temperature of the layer A is lowered. The preferable glass transition temperature of the layer A for having scratch recovery time at the temperature of 10° C. of 3 seconds or less is −30 to 0° C. The more preferable glass transition temperature of the layer A is −15 to −7° C.

Further, according to the first multilayer film of the invention, that is, a multilayer film having glass transition temperature of the layer of −30 to 0° C., the layer A preferably has scratch recovery time at the temperature of 10° C. of 3 seconds or less, and more preferably 2 seconds or less. When the layer A has scratch recovery time at the temperature of 10° C. of 3 seconds or less for a multilayer film having glass transition temperature of the layer A (Tg) of −30 to 0° C., a high performance multilayer film maintaining the self-healing property can be provided.

<Performance of Layer A>

According to the first and second multilayer film of the invention, contact angle of the layer A with water is preferably 95° or more and 104° or less at the temperature of 25° C. and humidity of 65%. When the contact angle of the layer A with water is 95° or more and 104° or less, good cosmetics resistance can be obtained. The cosmetics resistance indicates resistance to a cream preparation which has an effect of smoothening a skin or an effect of blocking UV rays. As the first and second multilayer film of an embodiment of the invention have high self-healing property and the contact angle of the layer A with water is 95° or more and 104° or less, when it is in contact with cosmetics, no whitening occurs on a surface with time, and therefore it has good cosmetics resistance. To have the contact angle of 95° or more and 104° or less, at least one week later at 20 to 80° C. after forming the layer A, the surface of the layer A is preferably subjected to a surface treatment like UV treatment, plasma treatment, corona treatment, and flame treatment.

According to the first and second multilayer film of the invention, to obtain a multilayer film having good cosmetics resistance, it is preferable that thickness of the layer A is prepared to be within the range of 15 to 19 By having the thickness of the layer A within the range of 15 to 19 µm, a multilayer film having the self-healing effect and good cosmetics resistance can be provided.

When the multilayer film of the invention is subjected to molding, thickness of the layer A will typically decrease by molding. As such, it is effective to increase in advance the thickness of the layer A depending on the molding magnification ratio. For the molding with molding magnification ratio of 1.1, preferable thickness of the layer A is 16.5 to 21 µm. For the molding with molding magnification ratio of 1.6, preferable thickness of the layer A is 24 to 30 µm.

With respect to the minimum elongation at break of the layer A in the multilayer film of the invention, the minimum elongation at break is preferably 65% or more and less than 100% at 80 to 150° C. When the minimum elongation at break is 65% or more at 80 to 150° C., the elongation can be maintained at sufficient level. Further, when it is less than 100%, conformability to abase film is good.

The layer A in the first and second film of the invention can be produced by following the processes described below, for example. It is particularly preferable to have an aging process after the laminating process and heating process, as the average elongation at break of the layer A at 80 to 150° C. can be prepared to be 65% or more.

Laminating Process

On at least one side of a base film, a layer (layer A) containing a polycaprolactone segment, a polysiloxane segment and/or a polydimethylsiloxane segment, and a urethane bond is laminated. As for the lamination of the layer A on a base film, a method of coating a coating solution containing the materials for forming the layer A, and if necessary, a solvent on at least one side of a base film can be mentioned. Further, examples of the coating method that can be used include a coating method known in the field like Gravure coating, Microgravure coating, die coating, reverse coating, knife coating, and bar coating.

Heating Process

By performing the heating, not only the solvent included in the layer is evaporated but also the cross linking reaction between an isocyanate group in the composition for forming the layer A and other segment can be promoted. According to the invention, the residual amount of an isocyanate group in the layer A after the heating process but before the aging process is preferably 10% or less compared to the amount of an isocyanate group before the heating process. More preferably, it is 5% or less. Sill more preferably, it is substantially 0%. The expression "substantially 0%" means that no isocyanate group is detected even when infrared spectrophotometric analysis is carried out. When the isocyanate group is present in a large amount in the layer A, the isocyanate group in the layer A reacts with moisture in the air to form a urea bond during the following aging process. As a result, the layer A after the aging process is hardened and it becomes the reason for lowering the average elongation at break of the layer A. For such reasons, it is preferable to have the reaction of an isocyanate group progressed as much as possible before the aging process (more preferably, the reaction is completed). When the reaction is insufficient, tackiness remains on the layer A, and when wound to have a roll shape, blocking with an opposite surface is caused, and as a result, there is a case in which releasing is difficult to achieve after aging.

The heating temperature for the heating process is preferably 150° C. or more. More preferably, it is 160° C. or more. Sill more preferably, it is 170° C. or more. Considering an occurrence of wrinkles or the like which is caused by thermal shrinkage of a base film, the heating temperature is preferably 180° C. or less. When the heating temperature is 150° C. or more, the cross linking reaction between an isocyanate group in the layer A and a hydroxy group in other segment is promoted.

The heating time is preferably 1 minute or more, preferably 2 minutes or more, and still more preferably 3 minutes or more. From the view point of maintaining the productivity and the dimensional stability and transparency of a base film, the heating time is preferably 5 minutes or less.

According to the invention, it is preferable that the heating temperature is 150° C. or more and the heating time is 1 to 5 minutes. More preferably, the heating temperature is 160° C. or more and the heating time is 1 to 3 minutes. Still more preferably, the heating temperature is 170° C. or more and the heating time is 1 to 2 minutes.

As for the method of heating for the heating process, it is preferably performed with hot air from the view point of heating efficiency. A known hot air dryer or a hot air furnace which allows continuous return like roll return or floating may be used.

Aging Process

After being heated by the heating process, the multilayer film is preferably subjected to an aging treatment. Aging temperature is preferably 20 to 80° C., more preferably 40° C. to 80° C., and still more preferably 60° C. to 80° C. The aging time is preferably 3 days or more, more preferably 7 days or more, and still more preferably 20 days or more. The urethane bond is increased by an aging treatment, and therefore the average elongation at break of the layer A can be adjusted to 65% or more. The aging treatment is preferably carried out in a sheet or roll state using a temperature-controllable incubator.

Preferred application of the multilayer film of the invention is molding application, in particular, use of decorated molding which is employed for a casing of a personal computer or a cellular phone. The multilayer film of the invention can be prepared as a molded body by using a molding method like injection molding, pressure molding, vacuum molding, heat molding, and press molding. Of these, it may be particularly preferably applied for the use including heating at 80° C. to 180° C. during molding.

Further, when it is applied for the molding use, the molding magnification ratio of the multilayer film of the invention is preferably 1.1 to 1.6 times. In a molded body, a bent portion or a curved portion can easily have high molding magnification ratio, in particular. However, when the molding magnification ratio is 1.1 to 1.6 times in a bent portion or a curved portion, it can conform to deep drawing molding, and therefore desirable.

<Multilayer Film Having Layer B>

A third multilayer film of the invention is a multilayer film having layer B at least on one side of a base film, in which the layer B contains a polycaprolactone segment and a urethane bond, and the layer B has the average elongation at break of 65% or more at 80° C. to 150° C. The third multilayer film of the invention has excellent conformability during heating molding and also a function of restoring scratches (surface scratches) or the like (that is, self-healing property). Further, when a scratch occurs on surface of the layer B, the third multilayer film of the invention can eliminate (that is, self-heal) a scratch within a short time like several seconds to several tens of seconds.

As used herein, the polycaprolactone segment indicates a segment represented by the following chemical formula.

[Chemical Formula 10]

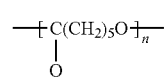

(n is an integer of 1 to 35).

When the layer B is formed by using a composition containing a resin which includes a polycaprolactone segment, the layer B can have a polycaprolactone segment. The resin including a polycaprolactone segment preferably has at least one or more hydroxy group. The hydroxy group is preferably present at an end of a resin including a polycaprolactone segment.

When the layer B has a component including a polycaprolactone segment, the layer B can have a self-healing property. In other words, even when a scratch is formed on surface of the layer B, the dent can be removed (that is, self-healed) within a short time like several seconds.

Preferred examples of the resin including a polycaprolactone segment include a polycaprolactone having 2 to 3 functional hydroxy groups. As a specific example, radical polymerizable polycaprolactone like the followings may be used:

polycaprolactone diol,

[Chemical Formula 11]

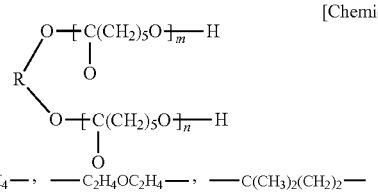

(m represents an integer of 1 to 34, n represents an integer of 1 to 34, with the proviso that m+n is an integer of 4 to 35. R represents —C$_2$H$_4$—, —C$_2$H$_4$OC$_2$H$_4$—, or —C(CH$_3$)$_2$(CH$_2$)$_2$—), polycaprolactone triol,

[Chemical Formula 12]

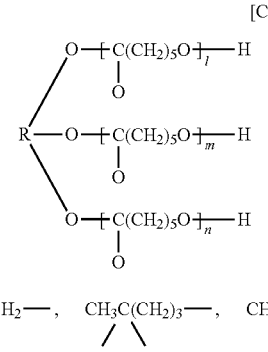

(l represents an integer of 1 to 28, m represents an integer of 1 to 28, n represents an integer of 1 to 28, with the proviso that l+m+n is an integer of 3 to 30), or lactone modified hydroxyethyl (meth)acrylate

[Chemical Formula 13]

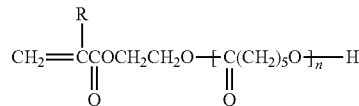

(R represents H or CH$_3$ and n represents an integer of 1 to 25).

Further, according to the invention, the resin including a polycaprolactone segment may contain (or, be copolymerized with) a segment or a monomer which is different from the polycaprolactone segment. For example, a polydimethylsiloxane segment or a polysiloxane segment may be contained (or, copolymerized).

Further, according to the invention, weight average molecular weight of the polycaprolactone segment in the resin including a polycaprolactone segment is preferably 500 to 2500. More preferably, the weight average molecular weight is 1000 to 1500. When the weight average molecular weight of the polycaprolactone segment is 500 to 2500, the effect of a self-healing property is further exhibited and scratch resistance is further improved.

For any case in which the polycaprolactone segment is copolymerized or added separately, having the polycaprolactone segment in an amount of 5 to 50% by mass per 100% by mass of the entire components in the composition which is used for forming the layer B is preferable from the view point of the scratch restoring property and contamination resistnace. As used herein, 100% by mass of the entire components in the composition does not include a solvent which is not involved with the reaction. Monomer component involved with the reaction is included therein.

According to an embodiment of the invention, the layer B has a urethane bond.

When the composition used for forming the layer B contains a commercially available urethane modified resin, it becomes possible for the layer B to have a urethane bond. Further, a urethane bond can be also included in the layer B by generating a urethane bond based on a reaction between an isocyanate group and a hydroxy group at the time of forming the layer B.

According to the invention, a urethane bond is included in the layer B preferably by generating a urethane bond based on a reaction between an isocyanate group and a hydroxy group. As a result of generating a urethane bond based on a reaction between an isocyanate group and a hydroxy group, not only the toughness of the layer B is improved but also the elasticity recovering property (self-healing property) of the layer B can be improved.

Further, when a resin including a polysiloxane segment or a resin including a polydimethylsiloxane segment has a hydroxy group, it is possible to generate a urethane bond between the resin described above and a compound having an isocyanate group by an action of heat or the like. When the layer B is formed by using a compound having an isocyanate group and the resin including a polysiloxane segment in which a hydroxy group is contained or the resin including polydimethylsiloxane segment in which a hydroxy group is contained, toughness and elasticity recovering property (self-healing property) of the layer B can be further improved, and therefore desirable.

According to the invention, the compound having an isocyanate group indicates a resin having an isocyanate group or a monomer or an oligomer containing an isocyanate group. Examples of the compound having an isocyanate group include polyisocyanate like methylenebis-4-cyclohexylisocyanate, a trimethylol propane adduct of tolylene diisocyanate, a trimethylol propane adduct of hexamethylene diisocyanate, a trimethylol propane adduct of isophorone diisocyanate, an isocyanurate form of tolylene diisocyanate, an isocyanurate form of hexamethylene diisocyanate, a biurete form of hexamethylene isocyanate, and a block form of the isocyanates.

Among the compounds having an isocyanate group, an aliphatic isocyanate is preferred compared to an alicyclic or aromatic isocyanate as it has a higher self-healing property. More preferred example of the compound having an isocyanate group is hexamethylene diisocyanate. Further, as a compound having an isocyanate group, isocyanate having an isocyanurate ring is particularly preferred from the view point of heat resistance. The isocyanurate form of hexamethylene diisocyanate is most preferred. The isocyanate having an isocyanurate ring forms the layer A having both the self-healing property and heat resistance.

The layer B of the invention is preferably formed according to the reaction caused by heat which induces formation of a urethane bond between an isocyanate group and a hydroxy group. When two or more isocyanate functional groups are present in the compound having an isocyanate group, more bondings to the compound having a hydroxy compound can be produced to improve physical properties, and therefore preferable.

According to the invention, for forming the layer B, the compound having an isocyanate group is contained in an amount of 11% by mass or more and 22% or less by mass per 100% by mass of the entire components of the composition and therefore preferable. However, 100% by mass of the entire components in the composition does not include a solvent which is not involved with the reaction. Monomer component involved with the reaction is included therein.

In the composition for forming the layer B, other cross linking agent including a melamine cross linking agent like alkoxymethylol melamine, an acid anhydride cross linking agent like 3-methyl-hexahydrophthalic anhydride, and an amine cross linking agent like diethylaminopropylamine may be included. If necessary, a cross linking catalyst like dibutyl tin dilaurate and dibutyl tin diethyl hexoate may be also used for promoting the reaction for forming a urethane bond.

The layer B preferably contains a polysiloxane segment, and/or a polydimethylsiloxane segment. By having a polysiloxane segment, and/or a polydimethylsiloxane segment, the layer B can have an easy slipping property, and therefore a scratch is not easily formed on a surface of the layer B.

As used herein, the polysiloxane segment represents a segment represented by the following formula.

[Chemical Formula 14]

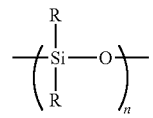

(R represents OH or an alkyl group having 1 to 8 carbon atoms and n represents an integer of 3 to 100).

In order for the layer B to have a polysiloxane segment and/or a polydimethylsiloxane segment, the composition used for forming the layer B needs to contain a resin including a polysiloxane segment.

According to the invention, a partial hydrolysate of a silane compound having a hydrolyzable silyl group, organosilica sol, or organosilica sol added with a hydrolyzable silane compound having a radical polymer can be used as the resin including a polysiloxane segment.

Examples of the resin including a polysiloxane segment include a total or partial hydrolysate of a silane compound having a hydrolyzable silyl group like tetraalkoxysilane, methyltrialkoxysilane, dimethyldialkoxysilane, γ-glycidoxypropyltrialkoxysilane, γ-glycidoxypropylalkyldialkoxysilane, γ-methacryloxypropyltrialkoxysilane, and γ-methacryloxypropylalkyldialkoxysilane, organosilica sol in which the silane compound is dispersed in an organic solvent, and organosilica sol of which surface is added with a hydrolyzable silane compound having a hydrolyzable silyl group.

Further, according to the invention, the resin including a polysiloxane segment may contain (or, be copolymerized with) a segment which is different from the polysiloxane segment. For example, a monomer component having a polycaprolactone segment or a polydimethylsiloxane segment may be contained (or, copolymerized).

According to the invention, a copolymer of monomers having a hydroxy group which reacts with an isocyanate group is preferably used as a resin including a polysiloxane segment. When monomers having a hydroxy group which reacts with an isocyanate group are copolymerized with the resin including a polysiloxane segment, toughness of the layer B is improved.

When the resin including a polysiloxane segment is a copolymer containing a hydroxy group, by forming the layer B using a composition including a resin including a polysiloxane segment with a hydroxy group and a compound with an isocyanate group, the layer B having both polysiloxane segment and urethane bond can be prepared efficiently.

As used herein, the polydimethylsiloxane segment indicates a segment represented by the following formula.

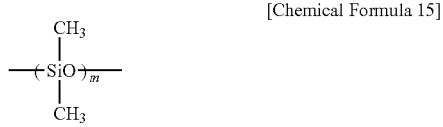

[Chemical Formula 15]

(m represents an integer of 10 to 300).

When the layer B contains a polydimethylsiloxane segment, the polydimethylsiloxane segment is coordinated to the surface of the layer B. As a result of coordination of a polydimethylsiloxane segment to the surface of the layer B, a lubricating property of the surface of the layer B is enhanced so that the friction resistance can be lowered. As a result, a property of having a scratch can be inhibited.

In order for the layer B to have a polysiloxane segment and/or a polydimethylsiloxane segment, the composition used for forming the layer B needs to contain a resin including a polydimethylsiloxane segment. According to the invention, preferred examples of the resin including a polydimethylsiloxane segment include a copolymer obtained by copolymerizing a vinyl monomer with a polydimethylsiloxane segment.

It is more preferable that the layer B has the resin including all of the polycaprolactone segment, polysiloxane segment and/or a polydimethylsiloxane segment, and a urethane bond in an amount of 80% by mass or more and 100% by mass or less per 100% by mass of the entire components for constituting the layer B. When the resin including all of the polycaprolactone segment, polysiloxane segment and/or a polydimethylsiloxane segment, and urethane bond is included in an amount of 80% or more by mass and 100% by mass or less per 100% by mass of the entire components for constituting the layer B, the self-healing property is improved.

The third multilayer film of the invention is a multilayer film having the layer B at least on one side of a base film, in which the layer B has the average elongation at break of 65% or more at 80° C. to 150° C. Preferably, the layer B has the average elongation at break of 80% or more, and more preferably 100% or more, at 80° C. to 150° C. From the view point of conformability to a base film and the average elongation at break of the layer B, the layer B has the average elongation at break of less than 150%. When the layer B has the average elongation at break of less than 65%, the B layer may be broken or peeled during molding like high degree molding (that is, molding with high magnification ratio) or deep drawing process. Further, uneven elongation is caused during molding, and as a result, a significant interference pattern is formed in some areas.

More preferably, the layer B has the minimum elongation at break of 65% or more at 80° C. to 150° C. When the layer B (that is, self-healing layer) has the minimum elongation at break of 65% or more at 80° C. to 150° C., the elongation can be maintained at sufficient level even at high molding temperature like 150° C. or more. Further, the layer B preferably has the minimum elongation at break of 100% or less at 80° C. to 150° C., from the view point of conformability to a base film.

The static coefficient of friction between surface of the layer B and glass surface is preferably 0.2 to 0.8. Accordingly, the mold friction resistance can be lowered during molding, which enables easier setting of a film.

To have a static coefficient of friction of 0.2 to 0.8, it is particularly effective to use a resin including a polydimethylsiloxane segment, which has an effect of providing an easy slipping property, in a composition for forming the layer B. When surface of the layer B is significantly flat, it is effective to include organic or inorganic particles in the layer B and to transfer fine patterns on surface of the layer B by nanoimprinting or the like. By adopting such method, a static coefficient of friction between the surface of the layer B and a glass surface can be easily adjusted to 0.2 to 0.8.

When transparency is required in particular, use of an inorganic oxide particle like silica, alumina, zirconia oxide, and titanium oxide having an average particle diameter of 10 to 200 nm is preferable. Content of the inorganic oxide particle is, per 100 parts by mass of the layer B, preferably 5 parts by mass or more and 30 parts by mass or less. More preferably, it is 10 parts by mass or more and 20 parts by mass or less. As for the inorganic oxide particle, organosol dispersed in an organic solvent is preferable.

To adjust the average elongation at break of the layer B to 65% or more, the layer B is preferably produced according to the laminating process, heating process, and aging process described below.

Laminating Process

As for the lamination of the layer B on a base film, a method of coating a coating solution (that is, a composition for forming the layer B) containing the materials for forming the layer B, and if necessary, a solvent on at least one side of a base film can be mentioned. Further, examples of the coating method that can be used include a coating method known in the field like Gravure coating, Microgravure coating, die coating, reverse coating, knife coating, and bar coating.

It is preferable that thickness of the layer B is within the range of 15 to 19 μm. By having the thickness of the layer B within the range of 15 to 19 μm, a multilayer film which has an excellent self-healing property, elongation, and cosmetics resistance can be provided. For the molding with molding magnification ratio of 1.1 times, preferable thickness of the layer B is 16.5 to 21 μm. For the molding with molding magnification ratio of 1.6 times, preferable thickness of the layer B is 24 to 30 μm.

Heating Process

By performing the heating, not only the solvent included in the layer is evaporated but also the cross linking reaction between an isocyanate group in the composition for forming the layer B and other segment can be promoted. According to the invention, the residual amount of an isocyanate group in the layer B after the heating process but before the aging process is preferably 10% or less compared to the amount of an isocyanate group before the heating process. More preferably, it is 5% or less. Sill more preferably, it is substantially 0%. The expression "substantially 0%" means that no isocyanate group is detected even when infrared spectrophotometric analysis is carried out. When the isocyanate group is present in a large amount in the layer B, the isocyanate group in the layer B reacts with moisture in the air to form a urea bond during the following aging process. As a result, the layer B after the aging process is hardened and it becomes the reason for lowering the average elongation at break of the layer B. For such reasons, it is preferable to have the reaction of an isocyanate group progressed as much as possible before the aging process (more preferably, the reaction is completed). When the reaction of an isocyanate group by low temperature drying is insufficient, tackiness remains on the layer B, and when wound to have a roll shape, blocking with an opposite surface is caused, and as a result, there is a case in which releasing is difficult to achieve after aging. Consequently, a releasing film coated with silicone or the like needs to be introduced as a separator, and therefore it is also disadvantageous in terms of cost.

For promoting the cross linking reaction between an isocyanate group in the compound having an isocyanate group and a hydroxy group in other segment that are contained in a composition for forming the layer B, the heating temperature for the heating process is preferably 150° C. or more. More preferably, it is 160° C. or more. Sill more preferably, it is 170° C. or more. Considering an occurrence of wrinkles or the like which is caused by thermal shrinkage of a base film, upper limit of the heating temperature is preferably 180° C. or less.

The heating time is preferably 1 minute or more, preferably 2 minutes or more, and still more preferably 3 minutes or more. From the view point of maintaining the productivity, the dimensional stability, and transparency of a base film, the heating time is preferably 5 minutes or less. Specifically, according to the invention, it is preferable that the heating temperature is 150° C. or more and the heating time is 1 to 5 minutes. More preferably, the heating temperature is 160° C. or more and the heating time is 1 to 3 minutes. Still more preferably, the heating temperature is 170° C. or more and the heating time is 1 to 2 minutes.

As for the method of heating for the heating process, it is preferably performed with hot air from the view point of heating efficiency. A known hot air dryer or a hot air furnace which allows continuous return like roll return or floating may be used.

Aging Process

After being heated for a short time and at high temperature by the heating process, the multilayer film is preferably subjected to an aging treatment. Further, aging temperature is preferably 20 to 80° C. The aging time is preferably 3 days or more, more preferably 7 days or more, and still more preferably 20 days or more for processing an aging treatment. The urethane bond is increased by an aging treatment, and therefore the average elongation at break of the layer B can be increased and adjusted to 65% or more.

Aging temperature for the aging process is preferably 20 to 80° C., more preferably 40° C. to 80° C., and still more preferably 60° C. to 80° C. When the aging is carried out at the temperature of 60° C. to 80° C., the aging time is preferably 3 days to 15 days. The aging treatment is preferably carried out in a sheet or roll state using a temperature-controllable incubator.

Preferred application of the multilayer film of the invention is molding application, in particular, use of decorated molding which is employed for a casing of a personal computer or a cellular phone. The multilayer film of the invention can be prepared as a molded body by using a molding method like injection molding, pressure molding, vacuum molding, heat molding, and press molding. Of these, it may be particularly preferably applied for the use including heating at 80° C. to 180° C. during molding.

Further, when it is applied for the molding use, the molding magnification ratio of the multilayer film of the invention is preferably 1.1 to 1.6 times. In a molded body, a bent portion or a curved portion can easily have high molding magnification ratio, in particular. However, when the molding magnification ratio is 1.1 to 1.6 times in a bent portion or a curved portion, it can conform to deep drawing molding, and therefore desirable.

[Method for Measuring Characteristics and Method for Evaluating Effect]

The method for measuring characteristics and method for evaluating their effect according to the invention are described below.

(1) Thickness of Layer A or Layer B

An ultra thin cross section was cut out from the multilayer film and observed by a transmission electron microscope (trade name: H-7100FA, manufactured by Hitachi, Ltd.) according to the method using $RuO_4$ staining or $OsO_4$ staining for measuring the layer thickness. The average value of measurements of 10 samples was used. Further, as to the area for measuring the molded film, the boundary regions that are 50 mm apart from the center of the film were cut off and the measurement was carried out at three areas therein.

(2) Average Elongation at Break of Layer B at 25° C., Average Elongation at Break of Layer B at 80 to 150° C., and Minimum Elongation at Break of Layer B at 80 to 150° C.

The multilayer film was cut out to have a size of 10 mm of width×200 mm of length, clamped in length direction using a chuck, and stretched at stretch speed of 100 mm/minute by using Instron type tensile tester (trade name: MODEL 5848, a tester for testing ultra fine materials, manufactured by Instron). The atmospheric temperature for measurement was 25° C. and the sample was collected at every 5% elongation unit. The thin film cross section of the sample collected was cut and with a ratio at which thickness of the layer B under observation is 30 mm or more on an image observed by a transmission electron microscope, the layer B was examined. A case of having cracks (fissures) with depth of 50% or more of the average thickness of the layer B was determined as an occurrence of a crack (that is, an occurrence of break in the layer B), and it was taken as the elongation at break of the corresponding film (25° C.—first time). The same measurement was repeated total three times to obtain the elongation at break (25° C.—first time), elongation at break (25° C.—second time), and elongation at break (25° C.—third time), and the average value thereof was obtained as the average elongation at break of the layer B at 25° C.

Subsequently, the average elongation at break of the layer B at the temperatures of 80° C., 100° C., 125° C., and 150° C. was obtained in the same manner as the case in which the atmospheric temperature for measurement is 25° C., except that the atmospheric temperature for measurement is changed to 80° C., 100° C., 125° C., and 150° C. The average value of the resulting average elongation at break of the layer B at the temperatures of 80° C., 100° C., 125° C., and 150° C. was obtained as the average elongation at break of the layer B at the temperatures of 80° C. to 150° C.

Further, the minimum value of the resulting average elongation at break of the layer B at the temperatures of 80° C., 100° C., 125° C., and 150° C. was obtained as the minimum elongation at break of the layer B at the temperatures of 80° C. to 150° C.

The average elongation at break of layer A at 25° C., average elongation at break of layer A at 80 to 150° C., and minimum elongation at break of layer A at 80 to 150° C. were measured in the same manner as the average elongation at break of layer B at 25° C., average elongation at break of layer B at 80 to 150° C., and minimum elongation at break of layer B at 80 to 150° C.

(3) Static Coefficient of Friction Between Surface of Layer B and Glass Surface

According to ASTM-D-1894 (established in 1995), a static coefficient of friction between a surface of the layer B and a glass surface (average surface roughness of a center line is 5 nm or less) was measured using a HEIDON type friction tester (trade name: HEIDON-14R manufactured by Shinto Science Co., Ltd.). Thereafter, the average value of five samples was calculated.

(4) Self-Healing Property of Layer A or Layer B

According to JIS K5600 (established in 1999) "Scratch hardness (pencil method)", a scratch was formed on a surface of coating. The conditions are as follows.

Scratch device: Pencil scratch tester (KT-VF 2391)
Pencil: HE pencil ("UNI", manufactured by MITSUBISHI PENCIL CO., LTD.)
Load: 750 g
Scratch speed: 10 mm/s.

A high speed camera was installed right above the sample and the time from an occurrence of a scratch to a point at which it becomes invisible was measured and taken as recovery time. Faster recovery time indicates higher self-healing property. The measurement was performed three times, and the average value was taken. Meanwhile, the measurement was performed in an acryl box of which temperature is controlled, and for the layer A, the measurement was performed when the temperature is 5° C., 10° C., and 20° C. For the layer B, the measurement was performed when the temperature is 25° C. Further, as to the area for measuring the molded film, the boundary regions that are 50 mm apart from the center of the film were cut off and the measurement was carried out at three areas therein. Conditions for taking an image using the camera are as follows.

Light source: Ring light of LuminarAce LA-150UX was installed at the tip of a camera
Camera: VW-6000 (KEYENCE CORPORATION)
Sample rate: 10 pps
Exposure time: 20000 μs.

(5) Tackiness

By touching the surface of the layer A or layer B of a multilayer film which has been obtained by heating according to the heating process, tackiness (that is, sticky property) was observed, and then evaluated according to the following criteria.

Good: No stickiness at all (film does not stick to a finger)
Slightly bad: Slight stickiness (although there is slight adhesion, film does not stick to a finger)
Bad: Stickiness (film sticks to a finger).

(6) Flatness

A multilayer film obtained after the aging process was placed on a black paper, and by installing a straight fluorescent pole lamp 30 cm above the paper, the fluorescent lamp was reflected on the film surface. Thereafter, the flatness of the film was evaluated according to the distortion level of the fluorescent lamp.

Good: There was absolutely no distortion of a fluorescent lamp.
Bad: The lamp looked clearly distorted.

(7) Steel Wool Resistance

A steel wool (#0000) with a size of 2 cm×2 cm was used. With application of a load of 200 g, surface of the sample was scrubbed and the number of strokes to generate a scratch was counted with a naked eye.

(8) Adhesion

The test was carried out according to the cross cut test described in JIS K5600 (established in 1999). Specifically, eleven lattice-like patterns were cut on surface of the layer A at intervals of 1 mm, yielding 100 cross cuts with a size of 1 mm×1 mm. Thereafter, a cellotape (manufactured by Sekisui Chemical Co., Ltd.) was bonded thereon and the tape was rapidly peeled at an angle of 90 degrees. State of the cross cuts that remained without being peeled was observed with a naked eye, and the adhesion was evaluated according to the criteria given below.

Good: No peeling is observed, indicating excellent adhesion
Bad: Peeling is evident, indicating problematic state for practical use.

(9) Residual amount of isocyanate group and presence or absence of urethane bond After finishing the aging, surface of the layer A was determined by using a FT-IR apparatus (trade name: FTS-7000e, manufactured by Digilab), and the results are expressed as X/Y. Smaller the value, lower the residual amount of an isocyanate group is. Further, the presence or absence of a urethane bond was determined based on the presence or absence of absorption peak Z.

X: peak strength at 2280 cm$^{-1}$ (absorption by an isocyanate group)
Y: peak strength at 2950 cm$^{-1}$ (absorption by an acrylate group)
Z: peak strength at 1701 cm$^{-1}$ or 1719 cm$^{-1}$ (absorption by a urethane bond)
Single reflection ATR apparatus: manufactured by Thermo Spectra-Tech
IRE: Ge
Incident angle: 45°
Resolution power: 8 cm$^{-1}$
Integration number: 128 times

(10) Tg of Layer A

Using a differential scanning calorimeter (DSC), the glass transition temperature was measured and calculated according to JIS-K-7122 (established in 1987). Specifically, a sample of the layer A, which has been obtained by carving with a sharp knife, was loaded to an aluminum pan, and the temperature was raised from −100° C. to 100° C. at the rate of 20° C./min.

Apparatus: "Robot DSC-RDC220" manufactured by Seiko Electronics Industrial Co., Ltd.

Data analysis: "DISK SESSION SSC/5200"

Weight of sample: 5 mg

(11) Contact Angle

The sample was kept for 24 hours under the condition including the temperature of 25° C. and relative humidity of 65%. Then, the measurement of contact angle with distilled water one minute after drop was performed by using a contact angle meter Model CA-D (manufactured by Kyowa Interface Science Co., Ltd.). Measurement was carried out three times for each sample and the average of three measurements was obtained as contact angle.

(12) Cosmetics Resistance

A mixture liquid containing tri(capryl-capric acid) glycerin, cetostearyl 2-ethylhexanoate, methylpolysiloxane, and isopropyl myristate of commercialized product, each in the same amount, was coated on a surface of the layer A and kept in an incubator for 6 hours, in which the incubator has constant temperature and humidity of 40° C. and 95%, respectively. After that, the resultant was dried for 1 hour at room temperature and the surface was wiped with a gauze. The surface was observed one day later, and the evaluation was carried out according to the following criteria. Further, the areas for measuring the molded film were within the 50 mm from the center of the film.

Very good: No occurrence of white spots

Good: Slight occurrence of white spots, but they are removed by wiping.

Slightly good: Slight occurrence of white spots and they are removed by wiping, but strong white spots occur after one day.

Bad: Occurrence of white spots, which is not removed by wiping.

(13) Molding

An end of the film was clamped with a clip by using a three-thread stretcher (trade name: KARO IV, manufactured by Bruckner), and the simultaneous biaxial stretching was carried out under the following conditions. At this time, to prevent the separation of the sample from the clip, fours sides of the sample were reinforced with a polyterephthalate film (10 mm width and 100 µl thickness). According to the stretching by this method, the multilayer film is stretched with the same behaviors as actual molding, and therefore the film obtained can be regarded as a molded body. Further, a film subjected to pre-heating but without stretching was also used as a molded film.

Film size: 100 mm×100 mm

Pressure of clip: 5 MPa

Temperature for pre-heating and stretching: 100° C.

Air flow amount by fan: 50%

Time for pre-heating: 40 seconds

Stretching speed: 20%/sec

(14) Molding Magnification Ratio

Cross section of the multilayer film and molded film was cut with a diamond knife of a microtome (trade name: RMS-50, manufactured by Nihon Microtome Laboratory Co., Ltd.). After deposition with platinum, thickness of the layer A was measured before and after the molding by using SEM (manufactured by Hitachi, Ltd.). Consequently, the magnification ratio of molding was obtained according to the following equation. As for an area for the measurement, the boundary regions that are 50 mm apart from the center of the molded film were cut off and the measurement was carried out at three areas therein.

Thickness of layer A (before molding)/Thickness of layer A (after molding)

(15) Molding Defect

After molding, state of the layer A was observed with a naked eye, and the evaluation was made according to the following criteria. Further, the areas for observation were the boundary that are 50 mm apart from the center of the film after molding.

Good: No occurrence of crack or peeling, indicating no problem in surface property.

Slightly bad: Slight occurrence of crack or peeling is observed.

Bad: There is an occurrence of crack or peeling, indicating problematic state for practical use.

EXAMPLES

Reference Example 1

Preparation of Raw Material A1

<Synthesis of Polysiloxane (a)>

To a flask (volume: 500 mL) equipped with a stirrer, a thermometer, a condenser, and a tube for introducing nitrogen gas, 106 parts by mass of ethanol, 320 parts by mass of tetraethoxysilane, 21 parts by mass of deionized water, and 1 part by mass of 1 wt % hydrochloric acid were added. After maintaining for 2 hours at 85° C., ethanol was recovered while raising the temperature and the mixture was maintained for 3 hours at 180° C. After cooling, viscous polysiloxane (a) was obtained.

<Synthesis of Polydimethylsiloxane Based Graft Copolymer (a)>

To the same apparatus as that used in the synthesis of the polysiloxane (a), 50 parts by mass of toluene, 50 parts by mass of methyl isobutyl ketone, 20 parts by mass of polydimethylsiloxane based polymer polymerization initiator (trade name: VPS-0501, manufactured by Wako Pure Chemical Industries, Ltd.), 30 parts by mass of methyl methacrylate, 26 parts by mass of butyl methacrylate, 23 parts by mass of 2-hydroxyethyl methacrylate, 1 part by mass of methacrylic acid, and 0.5 parts by mass of 1-thioglycerin were added. By reacting them for 8 hours at 80° C., polydimethylsiloxane based block copolymer (a) was obtained. The polydimethylsiloxane based block copolymer (a) obtained has solid matter concentration of 50% by mass.

<Blending of Raw Material A1>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 15 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A1 having the solid matter concentration of 40% by mass was produced.

Example 1

The raw material A1 was coated on a polyester base film (trade name: LUMIRROR U 46, manufactured by Toray Industries, Inc.) having thickness of 100 μm by using a wire bar so that the thickness of a layer A after aging process becomes 30 μm. After the coating, it was heated for 2 minutes at 160° C. by using hot air dryer (that is, heating process). After that, by performing heating (aging) for 14 days at 20° C. (that is, aging process), a multilayer polyester film was obtained. Next, the film obtained was subjected to molding. At that time, only pre-heating was carried out without performing stretching. The obtained results are given in Table 1.

Results of evaluating the film obtained (described as "film") and the molded film are given in Table 1. As a result, an excellent self-healing property was exhibited even at low temperature.

Example 2

A multilayer polyester film and a molded film were obtained in the same manner as Example 1 except that the thickness of the layer A is modified to 20 μm by changing the number of wire bar. The obtained results are given in Table 1. As a result, an excellent self-healing property was exhibited even when thickness of the layer A is reduced.

Examples 3 and 4

For Example 3, the stretching during molding was carried out in the ratio of 1.2 times in a longitudinal direction and 1.2 times in a transverse direction. For Example 4, the stretching during molding was carried out in the ratio of 1.3 times in a longitudinal direction and 1.3 times in a transverse direction. Other than that, a multilayer polyester film and a molded film were obtained in the same manner as Example 1. The obtained results are given in Table 1. As a result, an excellent self-healing property was exhibited even when thickness of the layer A is reduced. Further, a molding defect was not observed.

Reference Example 2

Preparation of Raw Material A2

<Blending of Raw Material A2>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 17 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A2 having the solid matter concentration of 40% by mass was produced.

Example 5

By using the raw material A2, a multilayer polyester film and a molded film were obtained in the same manner as Example 3. Stretching ratio during molding was 1.2 times in a longitudinal direction and 1.2 times in a transverse direction. The obtained results are given in Table 1. As a result, an excellent self-healing property was exhibited even when thickness of the layer A is reduced. Further, a molding defect was not observed.

Reference Example 3

Preparation of Raw Material A3

<Blending of Raw Material A3>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 8 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A3 having the solid matter concentration of 40% by mass was produced.

Example 6

By using the raw material A3, a multilayer polyester film and a molded film were obtained in the same manner as Example 3. Stretching ratio during molding was 1.2 times in a longitudinal direction and 1.2 times in a transverse direction. The obtained results are given in Table 1. As a result, an excellent self-healing property was exhibited even when thickness of the layer A is reduced. Further, a molding defect was not observed.

Reference Example 4

Preparation of Raw Material A4

<Synthesis of Polysiloxane (b)>

To a flask (volume: 500 mL) equipped with a stirrer, a thermometer, a condenser, and a tube for introducing nitrogen gas, 106 parts by mass of ethanol, 270 parts by mass of methyltrimethoxysilane, 23 parts by mass of γ-methacryloxypropyl methyl dimethoxysilane, 100 parts by mass of deionized water, 1 part by mass of 1 wt % hydrochloric acid, and 0.1 parts by mass of hydroquinone monomethyl ether were added. After allowing the reaction to occur for 3 hours at 80° C., polysiloxane (b) was synthesized, which was then adjusted to 50% by mass with methyl isobutyl ketone.
<Synthesis of Polydimethylsiloxane-Polycaprolactone Based Graft Copolymer (b)>

To the same apparatus as that used in the synthesis of the polysiloxane (b), 50 parts by mass of toluene and 50 parts by mass of isobutyl acetate were added following the increasing the temperature to 110° C. Separately, 20 parts by mass of methyl methacrylate, 32 parts by mass of caprolactone methacryl ester (trade name: PRAXEL FM-5, manufactured by Daicel Corporation), 17 parts by mass of 2-hydroxyethyl methacrylate, 10 parts by mass of the polysiloxane (b), 20 parts by mass of polydimethylsiloxane having methacryl group at single terminal (trade name: AK-32, manufactured by TOAGOSEI CO., LTD.), 1 part by mass of methacrylic acid, and 2 parts by mass, 1,1-azobiscyclohexane-1-carbonitirile were mixed. The resulting mixed monomers were added dropwise to the mixture liquid of toluene and butyl acetate over 2 hours. Thereafter, the reaction was allowed to occur for 8 hours at 110° C., and the polydimethylsiloxane-polycaprolactone based graft copolymer (b) having a hydroxy group in which the solid matter concentration is 50% by mass was obtained. The block copolymer obtained has solid matter concentration of 50% by mass.

<Blending of Raw Material A4>

To 100 parts by mass of the polydimethylsiloxane-polycaprolactone based graft copolymer (b), 12 parts by mass of the isocyanurate form of hexamethylene diisocyanate (trade name: TAKENATE D-170N, manufactured by Takeda Pharmaceutical Co., Ltd.) were added as a cross linking agent. By further using methyl ethyl ketone, the raw material A4 having the solid matter concentration of 40% by mass was produced.

Example 7

By using the raw material A4, a multilayer polyester film and a molded film were obtained in the same manner as Example 3. Stretching ratio during molding was 1.2 times in a longitudinal direction and 1.2 times in a transverse direction. The obtained results are given in Table 1. As a result, an excellent self-healing property was exhibited even when thickness of the layer A is reduced. Further, a molding defect was not observed.

Reference Example 5

Preparation of Raw Material A5

<Blending of Raw Material A5>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 312, manufactured by Daicel Corporation, weight average molecular weight 1250) are blended (mixed), 15 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A5 having the solid matter concentration of 40% by mass was produced.

Example 8

By using the raw material A5, a multilayer polyester film and a molded film were obtained in the same manner as Example 1. Meanwhile, the thickness of the layer A was adjusted to 18 µm after aging process. The obtained results are given in Table 1. As a result, an excellent self-healing property was exhibited even when thickness of the layer A is reduced.

TABLE 1

|  |  |  | Example 1 | Example 2 | Example 3 | Example 4 | Example 5 | Example 6 | Example 7 | Example 8 |
|---|---|---|---|---|---|---|---|---|---|---|
|  | Raw material for layer A | | A1 | A1 | A1 | A1 | A2 | A3 | A4 | A5 |
| Layer A | Parts by mass of composition (a) | | 77.5 | 77.5 | 77.5 | 77.5 | 79.5 | 70.5 | 62 | 77.5 |
|  | Parts by mass of compound having isocyanate group (b) | | 15 | 15 | 15 | 15 | 17 | 8 | 12 | 15 |
|  | (b/a) × 100 (% by mass) | | 19.4 | 19.4 | 19.4 | 19.4 | 21.4 | 11.3 | 19.4 | 19.4 |
|  | Tg (° C.) | | −7.2 | −7.2 | −7.2 | −7.2 | −3.5 | −30 | −8.5 | −9 |
| Film | Tackiness | | Good | Good | Good | Good | Good | Good | Good | Good |
|  | Adhesion | | Good | Good | Good | Good | Good | Good | Good | Good |
|  | Steel wool resistance | | 10 | 10 | 10 | 10 | 10 | 6 | 8 | 20< |
|  | Contact angle(°) | | 102 | 102 | 102 | 102 | 103 | 98 | 103 | 102 |
|  | Cosmetics resistance | | Slightly good | Slightly good | Slightly good | Slightly good | Slightly good | Slightly good | Slightly good | Good |
|  | Residual amount of isocyanate group (%) | | 0> | 0> | 0> | 0> | 0> | 0> | 0> | 0> |
|  | Presence or absence of urethane bond | | Present | Present | Present | Present | Present | Present | Present | Present |
|  | Thickness of layer A(mm) | | 30 | 20 | 30 | 30 | 30 | 30 | 30 | 18 |
|  | Self-healing property (seconds) | 5° C. | 7.8 | 8.5 | 7.8 | 7.8 | 28 | 3 | 7 | 7.8 |
|  |  | 10° C. | 2.3 | 2.3 | 2.3 | 2.6 | 2.6 | 1.9 | 2.5 | 2.7 |
|  |  | 20° C. | 0.1> | 0.1> | 0.1> | 0.1> | 0.1> | 0.1> | 0.1> | 0.1> |
| Molded film | Thickness of layer A (mm) | | 30 | 20 | 23 | 20 | 23 | 23 | 23 | 18 |
|  | Self-healing property (seconds) | 5° C. | 7.8 | 8.5 | 9.2 | 8.3 | 33 | 3.1 | 7.6 | 7.8 |
|  |  | 10° C. | 2.3 | 3 | 2.5 | 3 | 2.9 | 2.3 | 2.9 | 2.7 |
|  |  | 20° C. | 0.1> | 0.1> | 0.1> | 0.1> | 0.1> | 0.1> | 0.1> | 0.1> |
|  | Cosmetics resistance | | Slightly good | Good | Good | Good | Good | Good | Good | Good |
|  | Molding defect | | Good | Good | Good | Good | Good | Good | Good | Good |
|  | Magnification ratio of molding | | 1.00 | 1.00 | 1.30 | 1.58 | 1.30 | 1.30 | 1.30 | 1.00 |

The expression "Parts by mass of the composition (a)" means the total amount of the composition used for forming the layer A (excluding the solvent)

Examples 9 and 10

A multilayer polyester film and a molded body were obtained in the same manner as Example 8 except that the thickness of the layer A and the molding magnification ratio are changed. For Example 9, the stretching during molding was carried out in the ratio of 1.2 times in a longitudinal direction and 1.2 times in a transverse direction. For Example 10, the stretching during molding was carried out in the ratio of 1.3 times in a longitudinal direction and 1.3 times in a transverse direction. The obtained results are given in Table 2. As a result, an excellent self-healing property was exhibited even when thickness of the layer A is reduced. Further, a molding defect was not observed.

Reference Example 6

Preparation of Raw Material A6

<Synthesis of Polydimethylsiloxane Based Graft Copolymer (c)>

To the same apparatus as that used in the synthesis of the polysiloxane (a), 50 parts by mass of toluene, 50 parts by mass of methyl isobutyl ketone, 20 parts by mass of polydimethylsiloxane based polymer polymerization initiator (trade name: VPS-0501, manufactured by Wako Pure Chemical Industries, Ltd.), 18 parts by mass of methyl methacrylate, 38 parts by mass of butyl methacrylate, 23 parts by mass of 2-hydroxyethyl methacrylate, 1 part by mass of methacrylic acid, and 0.5 parts by mass of 1-thioglycerin were added. By reacting them for 8 hours at 180° C., polydimethylsiloxane based block copolymer (c) was obtained. The block copolymer obtained has solid matter concentration of 50% by mass.

<Blending of Raw Material A6>

To 100 parts by mass of a mixture in which 75 parts by mass of the polydimethylsiloxane based block copolymer (c), 10 parts by mass of the polysiloxane (c), and 15 parts by mass of polycaprolactone triol having a hydroxy group (trade name: PRAXEL 308, manufactured by Daicel Corporation, weight average molecular weight 850) are blended (mixed), 15 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A6 having the solid matter concentration of 40% by mass was produced.

Example 11

By using the raw material A6, a multilayer polyester film and a molded film were obtained in the same manner as Example 1. Meanwhile, the thickness of the layer A was adjusted to 15 µm after aging process. The obtained results are given in Table 2. As a result, an excellent self-healing property was exhibited even when thickness of the layer A is reduced.

Examples 12 and 13

A multilayer polyester film and a molded film were obtained in the same manner as Example 11 except that the thickness of the layer A and the molding ratio are changed. For Example 12, the stretching during molding was carried out in the ratio of 1.2 times in a longitudinal direction and 1.2 times in a transverse direction and the thickness of the layer A was 23 µm after the aging process. For Example 13, the stretching during molding was carried out in the ratio of 1.3 times in a longitudinal direction and 1.3 times in a transverse direction and the thickness of the layer A was adjusted to 19 µm after the aging process. The obtained results are given in Table 2. As a result, an excellent self-healing property was exhibited even when thickness of the layer A is reduced. Further, a molding defect was not observed.

Example 14

Surface of the molded film which has been obtained in the same manner as Example 13 was subjected to a plasma treatment using AiPlasma AS (trade name, manufactured by Panasonic Corporation) with output of 100 W, speed of 10 m/min, and distance between the film and nozzle of 5 mm. The obtained results are given in Table 2. As a result of performing the surface treatment, cosmetics resistance was improved.

Example 15

As the polyester resin C, polyethylene terephthalate (herein below, also referred to as PET) having intrinsic viscosity of 0.65 and melting point of 255° C. [trade name: F205, manufactured by Toray Industries, Inc.] was used. As the polyester resin D, a polyethylene terephthalate copolymer (that is, PET obtained by copolymerization of 30% by mol of cyclohexane dicarboxylic acid and 20% by mol of spiroglycol) having intrinsic viscosity of 0.72 to which 0.1% by mass of ADEKASTUB AS36 [trade name, manufactured by ADEKA Corporation] as an antioxidant is added was used. Each of the polyester resin C and polyester resin D was dried and fed to an extruder for each.

Each of the polyester resin C and polyester resin D was prepared in a molten state at 270° C. by using an extruder. After inserting five FSS type leaf disc filters, the polyester resin C and polyester resin D were alternately laminated by using a slit plate 1 with silt number of 267, a slit plate 2 with silt number of 269, and a slit plate 3 with silt number of 267, while quantifying them with a gear pump so that eject ratio between the polyester resin C and polyester resin D is 1.2:1. After being combined together in a feed block, a laminated body having 801 layers was obtained. Regarding the combined polyester resin C and polyester resin D, in the feed block, thickness of each layer was gradually increased from the surface side to an opposite surface side so that a structure in which 400 layers of the polyester resin A and 401 layers of the polyester resin B are laminated alternately in thickness direction is obtained. Further, the silt shape was designed to have almost the same layer thickness between neighboring layer C and layer D. According to such design, a reflection band exists in the region of from 350 nm to 1200 nm. The laminated body having total 801 layers as obtained above was fed to a multi-manifold die to form, on its surface, a layer of the polyester resin A which has been supplied from another extruder. After molding to have a sheet shape, it was solidified by rapid cooling on a casting drum, which has surface temperature of 25° C. by applying static current. The shape of flow pathway and total eject amount were set so as to have about 8 minutes from the combining of the polyester resin C and polyester resin D to solidification by rapid cooling on a casting drum.

The case film obtained was heated with a group of rolls set at 75° C. Within 100 mm distance of the stretch zone, it was stretched to 3.0 times in a longitudinal direction while both surfaces of the film are rapidly heated with a radiation heater. The film was then cooled. Next, the resulting monoaxially-stretched film was applied to a tenter, pre-heated with hot air of 100° C., and stretched to 3.3 times in a transverse direction at the temperature of 110° C. The stretched film itself was subjected to a heat treatment with hot air of 235° C. in the tenter. Subsequently, a 5% (width direction) relaxing treatment was carried out at the same temperature. After gradually cooled to room temperature, the film was wound. Thickness of the obtained film was 100 µm. The multilayer film obtained has no peeling between layers and had excellent glossiness.

Layer A was formed on the multilayer film in the same manner as Example 13 to give a multilayer polyester film and a molded film. The obtained results are given in Table 2. The film and molded film obtained have appearance with excellent metallic luster and an excellent self-healing property.

Example 16

Copolymerized polyester (trade name: EatsterPET G6763, manufactured by Eastman Chemical Company) in which 33% by mol of 1,4-cyclohexane dimethanol is copolymerized compared to glycol component and PET having intrinsic viscosity of 0.65 and melting point of 255° C. [trade name: F20S, manufactured by Toray Industries, Inc.] were mixed with each other with mass ratio of 76:24. The mixture was melt-kneaded at 280° C. by using a bent type biaxial extruder.

As a result, a polyethylene terephthalate resin with 25% by mol of copolymerized 1,4-cyclohexadimethanol in which diethyl glycol as a byproduct was copolymerized in an amount of 2% by mol compared to the glycol component in the resin was obtained. The resulting resin was referred to as a polyethylene terephthalate resin with 25% by mol of copolymerized 1,4-cyclohexadimethanol (copolymerization ratio of diethylene glycol:2% by mol).

PET having intrinsic viscosity of 0.65 and melting point of 255° C. [trade name: F20S, manufactured by Toray Industries, Inc.] and the polyethylene terephthalate resin with 25% by mol of copolymerized 1,4-cyclohexadimethanol (copolymerization ratio of diethylene glycol:2% by mol) were mixed with each other with mass ratio of 70:30. The mixture was dried for 4 hours at 180° C. using a vacuum dryer to remove the moisture completely. Thereafter, it was fed to a monoaxial extruder for melting at 275° C., and after removing impurities and controlling the extrudate amount at constant level, the mixture was ejected in a sheet shape from a T die onto a cooling drum which has been controlled to the temperature of 25° C. At that time, static current was applied by using a wire-like electrode having a diameter of 0.1 mm and by adhering it close to the cooling drum, a non-stretched film was obtained.

Subsequently, the film temperature was raised with a heating roll before stretching in a longitudinal direction, and then the stretching was carried out to 3.2 times in a longitudinal direction with the pre-heating temperature of 90° C. and stretching temperature of 95° C. Immediately thereafter, the film was cooled with a metallic roll with controlled temperature of 40° C.

Subsequently, by using a tenter-type transverse stretching device, the film was stretched to 3.5 times in a width direction with the pre-heating temperature of 90° C. and stretching temperature of 100° C. The film itself was then subjected to the heat treatment in the tenter at the temperature of 210° C. for 5 seconds while 4% relax is applied in width direction. As a result, a biaxially oriented polyester film having film thickness of 188 μm was obtained. The biaxially oriented polyester film obtained has slightly weak scratch resistance, but has excellent transparency and molding property.

Layer A was formed on the biaxially oriented polyester film obtained above in the same manner as Example 13 to give a multilayer polyester film and a molded film. The obtained results are given in Table 2. The film and molded film obtained have an excellent self-healing property.

Reference Example 7

Preparation of Raw Material A7

<Blending of Raw Material A7>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 15 parts by mass of the biurete form of hexamethylene diisocyanate (trade name: DESMODUR N3200, manufactured by Bayer AG) were added. With dilution by further using methyl ethyl ketone, the raw material A7 having the solid matter concentration of 40% by mass was produced.

Example 17

By using the raw material A7, a multilayer polyester film was obtained according to the same conditions as Example 1. Next, the film was molded in the same manner as Example 1. The results of evaluating the film and molded film obtained are given in Table 2. As a result, an excellent self-healing property was exhibited even at low temperature.

TABLE 2

|  |  | Example 9 | Example 10 | Example 11 | Example 12 | Example 13 | Example 14 | Example 15 | Example 16 | Example 17 |
|---|---|---|---|---|---|---|---|---|---|---|
| Raw material for layer A |  | A5 | A5 | A6 | A6 | A6 | A6 | A6 | A6 | A7 |
| Layer A | Parts by mass of composition (a) | 77.5 | 77.5 | 77.5 | 77.5 | 77.5 | 77.5 | 77.5 | 77.5 | 77.5 |
|  | Parts by mass of compound having isocyanate group (b) | 15 | 15 | 15 | 15 | 15 | 15 | 15 | 15 | 15 |
|  | (b/a) × 100 (% by mass) | 19.4 | 19.4 | 19.4 | 19.4 | 19.4 | 19.4 | 19.4 | 19.4 | 19.4 |
|  | Tg (° C.) | −9 | −9 | −12.5 | −12.5 | −12.5 | −12.5 | −12.5 | −12.5 | −5.6 |
| Film | Tackiness | Good | Good | Good | Good | Good | Good | Good | Good | Good |
|  | Adhesion | Good | Good | Good | Good | Good | Good | Good | Good | Good |
|  | Steel wool resistance | 20< | 20< | 18 | 19 | 19 | 19 | 18 | 18 | 12 |
|  | Contact angle (°) | 102 | 102 | 102 | 102 | 102 | 95 | 102 | 102 | 101 |
|  | Cosmetics resistance | Slightly good | Slightly good | Good | Slightly good | Slightly good | Slightly good | Slightly good | Slightly good | Slightly good |
|  | Residual amount of isocyanate group (%) | 0> | 0> | 0> | 0> | 0> | 0> | 0> | 0> | 0> |
|  | Presence or absence of urethane bond | Present | Present | Present | Present | Present | Present | Present | Present | Present |
|  | Thickness of layer A (mm) | 30 | 30 | 15 | 30 | 30 | 30 | 30 | 30 | 30 |
|  | Self-healing property (seconds) 5° C. | 6.5 | 6.5 | 6.9 | 5.6 | 5.6 | 5.6 | 6 | 6.2 | 20 |
|  | 10° C. | 1.8 | 2.2 | 2.5 | 0.9 | 0.9 | 0.9 | 0.9 | 0.9 | 2.5 |
|  | 20° C. | 0.1> | 0.1> | 0.1> | 0.1> | 0.1> | 0.1> | 0.1> | 0.1> | 0.1> |
| Molded film | Thickness of layer A (mm) | 23 | 19 | 15 | 23 | 19 | 19 | 19 | 19 | 30 |
|  | Self-healing property (seconds) 5° C. | 7 | 7.8 | 6.9 | 5.8 | 6.1 | 6.1 | 6.5 | 6.7 | 20 |
|  | 10° C. | 2.5 | 2.6 | 2.5 | 1.4 | 1.6 | 1.3 | 1.6 | 1.6 | 2.5 |
|  | 20° C. | 0.1> | 0.1> | 0.1> | 0.1> | 0.1> | 0.1> | 0.1> | 0.1> | 0.1> |
|  | Cosmetics resistance | Good | Good | Good | Good | Good | Excellent | Good | Good | Slightly good |
|  | Molding defect | Good | Good | Good | Good | Good | Good | Good | Good | Good |
|  | Magnification ratio of molding | 1.30 | 1.58 | 1.00 | 1.30 | 1.58 | 1.58 | 1.58 | 1.58 | 1.00 |

The expression "Parts by mass of the composition (a)" means the total amount of the composition used for forming the layer A (excluding the solvent).

Reference Example 8

Preparation of Raw Material A8

<Blending of Raw Material A8>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 36 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A8 having the solid matter concentration of 40% by mass was produced.

Comparative Example 1

By using the raw material A8, a multilayer polyester film and a molded film were obtained in the same manner as Example 3. Stretching ratio during molding was 1.2 times in a longitudinal direction and 1.2 times in a transverse direction. The obtained results are given in Table 3. As a result, glass transition temperature of the layer A was 11° C. and the scratch recovery time of the layer A at 10° C. was 167 seconds.

Reference Example 9

Preparation of Raw Material A9

<Blending of Raw Material A9>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 25 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A9 having the solid matter concentration of 40% by mass was produced.

Comparative Example 2

By using the raw material A9, a multilayer polyester film and a molded film were obtained in the same manner as Example 3. Stretching ratio during molding was 1.2 times in a longitudinal direction and 1.2 times in a transverse direction. The obtained results are given in Table 3. As a result, glass transition temperature of the layer A was 6.1° C. and the scratch recovery time of the layer A at 10° C. was 145 seconds.

Reference Example 10

Preparation of Raw Material A10

<Blending of Raw Material A10>

To 100 parts by mass of a mixture in which 75 parts by mass of the polydimethylsiloxane based block copolymer (a), 10 parts by mass of the polysiloxane (a), and 15 parts by mass of polycaprolactone trial having a hydroxy group (trade name: PRAXEL 308, manufactured by Daicel Corporation, weight average molecular weight 850) are blended (mixed), 7 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material A10 having the solid matter concentration of 40% by mass was produced.

Comparative Example 3

By using the raw material A10, a multilayer polyester film and a molded film were obtained in a similar manner as Example 3. Stretching ratio during molding was 1.2 times in a longitudinal direction and 1.2 times in a transverse direction. The obtained results are given in Table 3. As a result, glass transition temperature of the layer A was −31.2° C. and the scratch recovery time of the layer A at 10° C. was 4.5 seconds. According to Comparative example 3, the curing was insufficient, and tackiness, adhesion and steel resistance were all poor, and therefore unsuitable for practical use.

Reference Example 11

Synthesis of Raw Material B1

<Synthesis of Polydimethylsiloxane Based Graft Copolymer (d)>

Polydimethylsiloxane based graft copolymer (d) was synthesized in a similar manner as Reference example 3 except that the monomer composition is changed to 20 parts by mass of methyl methacrylate, 26 parts by mass of butyl methacrylate, 23 parts by mass of 2-hydroxyethyl methacrylate, 10 parts by mass of the polysiloxane (a), 1 part by mass of methacrylic acid, and 20 parts by mass of polydimethylsiloxane having methacryl modification at single terminal (trade name: X-22-174DX, manufactured by Shin-Etsu Chemical Co., Ltd.). The block copolymer G obtained has solid matter concentration of 50% by mass.

<Blending of Raw Material B1>

To 100 parts by mass of polydimethylsiloxane based block copolymer (d), 12 parts by mass of the trimethylol propane adduct of hexamethylene diisocyanate (trade name: BURNOCK DN-950, manufactured by DIC Corporation, solid matter: 75% by mass) were added as across linking agent. With dilution by further using methyl ethyl ketone, the raw material B1 having the solid matter concentration of 40% by mass was produced.

Comparative Example 4

By using the raw material B1 instead of the raw material A1, a multilayer polyester film and a molded film were obtained in a similar manner as Example 3. In the raw material B1, no caprolactone segment was included. Stretching ratio during molding was 1.2 times in a longitudinal direction and 1.2 times in a transverse direction. The obtained results are given in Table 3. As a result, glass transition temperature of the layer A was −11° C. and the scratch recovery time of the layer A at 10° C. was 500 seconds or more.

Reference Example 12

Preparation of Raw Material B2

<Synthesis of Polydimethylsiloxane Based Graft Copolymer (e)>

To the same apparatus as that used in the synthesis of the polysiloxane (a), 50 parts by mass of toluene and 50 parts by mass of methyl isobutyl ketone were added followed by increasing the temperature to 80° C. Separately, 30 parts by mass of methyl methacrylate, 26 parts by mass of butyl methacrylate, 23 parts by mass of 2-hydroxyethyl methacrylate, 1 part by mass of methacrylic acid, 20 parts by mass of polydimethylsiloxane having methacryl modification at single terminal (trade name: X-22-174DX, manufactured by Shin-Etsu Chemical Co., Ltd.), and 1 part by mass of azobis-2-methyl butyronitrile (trade name: ABN-E, manufactured by JAPAN FINECHEM COMPANY, INC.) were added and mixed. The mixed monomers were added dropwise to the mixture liquid of toluene and methyl isobutyl ketone over 3 hours. Thereafter, the reaction was allowed to occur for 6 hours to obtain a polydimethylsiloxane based graft copolymer (e). The polydimethylsiloxane based graft copolymer (e) obtained has solid matter concentration of 50% by mass.

<Blending of Raw Material B2>

To 85 parts by mass of the polydimethylsiloxane based block copolymer (e), 15 parts by mass of polycaprolactone triol having a hydroxy group (trade name: PRAXEL 308, manufactured by Daicel Corporation, weight average molecular weight 850) were added, and then 18 parts by mass of the isocyanurate form of hexamethylene diisocyanate (trade name: TAKENATE D-170N, manufactured by Takeda Pharmaceutical Co., Ltd.) were added thereto as a cross linking agent. With dilution by further using methyl ethyl ketone, the raw material B2 having the solid matter concentration of 40% by mass was produced.

Comparative Example 5

By using the raw material B2 instead of the raw material A1, a multilayer polyester film and a molded film were obtained in a similar manner as Example 3. Stretching ratio during molding was 1.2 times in a longitudinal direction and 1.2 times in a transverse direction. The obtained results are given in Table 3. As a result, glass transition temperature of the layer A was 4° C. and the scratch recovery time of the layer A at 10° C. was 4 seconds.

Reference Example 13

Preparation of Raw Material A11

<Blending of Raw Material A11>

To 100 parts by mass of the polydimethylsiloxane-polycaprolactone based graft copolymer (b), 25 parts by mass of the isocyanurate form of hexamethylene diisocyanate (trade name: TAKENATE D-170N, manufactured by Takeda Pharmaceutical Co., Ltd.) were added thereto as a cross linking agent. With dilution by further using methyl ethyl ketone, the raw material A11 having the solid matter concentration of 40% by mass was produced.

Comparative Example 6

By using the raw material A11 instead of the raw material A1, a multilayer polyester film and a molded film were obtained in a similar manner as Example 3. Stretching ratio during molding was 1.2 times in a longitudinal direction and 1.2 times in a transverse direction. The obtained results are given in Table 3. As a result, glass transition temperature of the layer A was 10.4° C. and the scratch recovery time of the layer A at 10° C. was 58 seconds.

TABLE 3

| | | Comparative example 1 | Comparative example 2 | Comparative example 3 | Comparative example 4 | Comparative example 5 | Comparative example 6 |
|---|---|---|---|---|---|---|---|
| Raw material for layer A | | A8 | A9 | A10 | B1 | B2 | A11 |
| Layer A | Parts by mass of composition(a) | 98.5 | 87.5 | 69.5 | 62 | 75.5 | 75 |
| | Parts by mass of compound having isocyanate group (b) | 36 | 25 | 7 | 12 | 18 | 25 |
| | (b/a) × 100 (% by mass) | 36.5 | 28.6 | 10.1 | 19.4 | 23.8 | 33.3 |
| | Tg (° C.) | 11 | 6.1 | −31.2 | −11 | 4 | 10.4 |
| Film | Tackiness | Good | Good | Bad | Good | Good | Good |
| | Adhesion | Good | Good | Bad | Good | Good | Good |
| | Steel wool resistance | 12 | 11 | 5 | 8 | 10 | 8 |
| | Contact angle(°) | 107 | 104 | 98 | 97 | 97 | 104 |
| | Cosmetics resistance | Bad | Bad | Slightly good | Good | Good | Bad |
| | Residual amount of isocyanate group (%) | 0.05 | 0.01 | 0> | 0> | 0> | 0> |
| | Presence or absence of urethane bond | Present | Present | Present | Present | Present | Present |
| | Thickness of layer A(mm) | 30 | 30 | 30 | 30 | 30 | 30 |
| | Self-healing property(seconds) 5° C. | 500< | 500< | 3.8 | 500< | 500< | 500< |
| | 10° C. | 167 | 145 | 3.1 | 500< | 4 | 58 |
| | 20° C. | 15 | 11 | 0.4 | 500< | 0.4 | 10 |

TABLE 3-continued

|  |  |  | Comparative example 1 | Comparative example 2 | Comparative example 3 | Comparative example 4 | Comparative example 5 | Comparative example 6 |
|---|---|---|---|---|---|---|---|---|
| Molded film | Thickness of layer A(mm) |  | 23 | 23 | 23 | 23 | 23 | 23 |
|  | Self-healing property(seconds) | 5° C. | 500< | 500< | 5 | 500< | 500< | 500< |
|  |  | 10° C. | 250 | 225 | 4.5 | 500< | 5.8 | 69 |
|  |  | 20° C. | 23 | 15 | 1.2 | 500< | 1 | 14 |
|  | Cosmetics resistance |  | Slightly good | Slightly good | Slightly good | Good | Good | Slightly good |
|  | Molding defect |  | Good | Good | Good | Slightly bad | Slightly bad | Good |
|  | Magnification ratio of molding |  | 1.30 | 1.30 | 1.30 | 1.30 | 1.30 | 1.30 |

The expression "Parts by mass of the composition (a)" means the total amount of the composition used for forming the layer A (excluding the solvent).

Reference Example 14

Preparation of Raw Material B3

Reference Example 7

Preparation of Raw Material B3

<Synthesis of Urethane Acrylate (a)>

To the same apparatus as that used in the synthesis of the polysiloxane (b), 57.7 parts by mass of toluene and 9.7 parts by mass of stearyl alcohol (trade name: NAA46, manufactured by NOF CORPORATION) were added and the temperature was raised to 40° C. After confirming that the stearyl alcohol is completely dissolved, 25 parts by mass of hexamethylene diisocyanate (manufactured by Tokyo Chemical Industry Co., Ltd.) was added thereto and the temperature was raised to 70° C. After allowing the reaction to occur for 30 min at the same temperature, 0.02 parts by mass of dibutyl tin laurate were added and the temperature was maintained at the same temperature for 3 hours. Then, 100 parts by mass of polycaprolactone modified hydroxyethyl acrylate (trade name: PRAXEL FA2D, manufactured by Daicel Corporation), 0.02 parts by mass of dibutyl tin laurate, and 0.02 parts by mass of hydroquinone monomethyl ether were added thereto. After maintaining for 3 hours at 70° C., the reaction was completed, and by adding 77 parts of toluene, urethane acrylate having solid matter concentration of 50% by mass was obtained.

<Blending of Raw Material B3>

To 100 parts by mass of the urethane acrylate (a) obtained, 20 parts by mass of phthalic acid monohydroxyethyl acrylate (trade name: M-5400, manufactured by TOAGOSEI CO., LTD.), 20 parts of toluene, and 3 parts by mass of photoinitiator (trade name: IRUGACURE184, manufactured by Nihon Ciba-Geigy K. K.) were added to produce the raw material B3 having solid matter concentration of 50% by mass.

Comparative Example 7

The raw material B3 was coated on a polyester base film (trade name: LUMIRROR U 46, manufactured by Toray Industries, Inc.) having thickness of 100 μm by using a wire bar so that the thickness of a layer A after irradiation of UV rays becomes 30 μm. After the coating, it was dried for 1 min at 60° C. by using hot air dryer. After that, by irradiation of UV rays with a high pressure mercury lamp (irradiation amount: 300 mJ/cm$^2$), a multilayer polyester film was obtained. Next, the film obtained was subjected to stretching during molding and the stretching ratio was 1.2 times in a longitudinal direction and 1.2 times in a transverse direction.

As a result, a molded film was obtained. The obtained results are given in Table 4. The layer A has excellent steel wool resistance but has a poor self-healing property. Further, a crack occurred at an end after the molding.

Reference Example 15

Preparation of Raw Material B4

<Synthesis of Urethane Acrylate (b)>

The same apparatus as used for the synthesis of the polysiloxane (a) was used and the reaction was carried out using 30 parts by mass of triethylene diisocyanate derivative (trade name: TAKENATE D-212, manufactured by Takeda Pharmaceutical Co., Ltd.) and 70 parts by mass of polycaprolactone modified hydroxyethyl acrylate (trade name: PRAXEL FA3, manufactured by Daicel Corporation). The block copolymer obtained has the solid matter concentration of 50% by mass.

<Synthesis of Polydimethylsiloxane Based Graft Copolymer (e)>

The same apparatus as used for the synthesis of the polysiloxane (a) was used and the reaction was carried out using 10 parts by weight of polydimethylsiloxane macromonomer (trade name: FM0721, manufactured by CHISSO CORPORATION), 30 parts by mass of butyl methacrylate, 15 parts by mass of isocyanate ethyl methacrylate (trade name: KARENZ MOI, manufactured by Showa Denko K. K.), 20 parts by mass of pentaerythritol acrylate [trade name: ARONIX M305, manufactured by TOAGOSEI CO., LTD.], and 25 parts by methyl methacrylate.

<Blending of Raw Material B4>

Seventy-two parts by mass of the urethane acrylate (b), 20 parts by mass of the polydimethylsiloxane based graft copolymer d, 5 parts of a copolymer containing polyorganosiloxane group (trade name: MODIPER FS710, manufactured by NOF CORPORATION), and 3 parts by mass of 1-hydroxy-cyclohexyl-phenyl-ketone as a photopolymerization initiator were mixed with another to produce the raw material B4 having solid matter concentration of 50% by mass.

Comparative Example 8

By using the raw material B4 instead of the raw materials B3, a multilayer polyester film and a molded film were given in a similar manner as Comparative example 7. The obtained results are given in Table 4. As a result, the layer A has excellent steel wool resistance but has a poor self-healing property. Further, a crack occurred at an end after the molding.

The raw material A1 was coated on a polyester base film (trade name: LUMIRROR U 46, manufactured by Toray Industries, Inc.) having thickness of 100 μm by using a wire bar so that the thickness of a layer A after aging process becomes 30 μm. After the coating, it was dried for 2 min at 160° C. by using hot air dryer (that is, heating process). After that, by performing heating (aging) for 14 days at 20° C. (that is, aging process), a multilayer polyester film was obtained. Next, the film obtained was subjected to molding. At that time, only pre-heating was carried out without performing stretching. The obtained results are given in Table 1.

Comparative Example 9

The polyester base film (trade name: LUMIRROR U 46, manufactured by Toray Industries, Inc.) having thickness of 100 μm was heated (that is, aged) under the same conditions as Example 1 (that is, it was dried for 2 min at 160° C. by using hot air dryer, and then heated (aged) for 14 days at 20° C.). In this regard, unlike Example 1, the raw material A1 was not coated on the polyester base film (trade name: LUMIRROR U 46, manufactured by Toray Industries, Inc.) having thickness of 100 μm. The obtained results are given in Table 4. As a result, it was found that the film obtained has no self-healing property and easily receives a surface scratch.

Comparative Example 10

Under the same conditions as Example 15, a multilayer film having the polyester resin C and polyester resin D was produced. In this regard, unlike Example 15, the raw material A6 was not coated on the multilayer film having the polyester resin C and polyester resin D. The obtained results are given in Table 4. As a result, it was found that the film obtained has no self-healing property and easily receives a surface scratch.

Reference Example 16

Preparation of Raw Material A12

<Blending of Raw Material A12>
To 100 parts by mass of the mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 15 parts by mass of the adduct form of tolylene diisocyanate (trade name: TAKENATE D-103H, manufactured by Takeda Pharmaceutical Co., Ltd.) were added. With dilution by further using methyl ethyl ketone, the raw material A12 having the solid matter concentration of 40% by mass was produced.

Comparative Example 11

Under the same conditions as Example 1, a multilayer polyester film and molded film were obtained except that the raw material A12 is used instead of the raw material A1. The results of evaluating the film and molded obtained are given in Table 4. As a result, glass transition temperature of the layer A was 63° C. and the scratch recovery time of the layer A at 10° C. was 500 seconds or more.

Reference Example 17

Preparation of Raw Material A13

<Blending of Raw Material A13>
To 100 parts by mass of the mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 15 parts by mass of the adduct form of xylylene diisocyanate (trade name: TAKENATE D-110N, manufactured by Takeda Pharmaceutical Co., Ltd.) were added. With dilution by further using methyl ethyl ketone, the raw material A13 having the solid matter concentration of 40% by mass was produced.

Comparative Example 12

Under the same conditions as Example 1, a multilayer polyester film and molded film were obtained except that the raw material A13 is used instead of the raw material A1. The results of evaluating the film and molded obtained are given in Table 4. As a result, glass transition temperature of the layer A was 56° C. and the scratch recovery time of the layer A at 10° C. was 500 seconds or more.

TABLE 4

|  |  |  | Comparative example 7 | Comparative example 8 | Comparative example 9 | Comparative example 10 | Comparative example 11 | Comparative example 12 |
|---|---|---|---|---|---|---|---|---|
|  | Raw material for layer A |  | B3 | B4 | — | — | A12 | A13 |
| Layer A | Parts by mass of composition(a) |  | 123 | 100 | — | — | 77.5 | 77.5 |
|  | Parts by mass of compound having isocyanate group (b) |  | — | — | — | — | 15 | 15 |
|  | (b/a) × 100 (% by mass) |  | — | — | — | — | 19.4 | 19.4 |
|  | Tg (° C.) |  | 28 | 18 | — | — | 63 | 56 |
| Film | Tackiness |  | Good | Good | — | — | Good | Good |
|  | Adhesion |  | Good | Good | — | — | Good | Good |
|  | Steel wool resistance |  | 20< | 20< | 1 | 1 | 20< | 20< |
|  | Contact angle(°) |  | 110 | 112 | 78 | 80 | 113 | 105 |
|  | Cosmetics resistance |  | Excellent | Excellent | Excellent | Excellent | Excellent | Excellent |
|  | Residual amount of isocyanate group (%) |  | 0> | 0> | — | — | 0> | 0> |
|  | Presence or absence of urethane bond |  | Present | Present | — | — | Present | Present |
|  | Thickness of layer A(mm) |  | 30 | 30 | — | — | 30 | 30 |
|  | Self-healing property(seconds) | 5° C. | 500< | 500< | 500< | 500< | 500< | 500< |
|  |  | 10° C. | 500< | 500< | 500< | 500< | 500< | 500< |
|  |  | 20° C. | 500< | 180 | 500< | 500< | 500< | 500< |

TABLE 4-continued

|  |  |  | Comparative example 7 | Comparative example 8 | Comparative example 9 | Comparative example 10 | Comparative example 11 | Comparative example 12 |
|---|---|---|---|---|---|---|---|---|
| Molded film | Thickness of layer A(mm) |  | 23 | 23 | — | — | 30 | 30 |
|  | Self-healing property(seconds) | 5° C. | 500< | — | 500< | 500< | 500< | 500< |
|  |  | 10° C. | — | — | 500< | 500< | 500< | 500< |
|  |  | 20° C. | — | — | 500< | 500< | 500< | 500< |
|  | Cosmetics resistance |  | — | — | — | — | Excellent | Excellent |
|  | Molding defect |  | Bad | Bad | — | — | Good | Good |
|  | Magnification ratio of molding |  | 1.30 | 1.30 | — | — | 1.00 | 1.00 |

The expression "Parts by mass of the composition (a)" means the total amount of the composition used for forming the layer A (excluding the solvent).

Example 18

The raw material A9 was coated on a polyester base film (trade name: LUMIRROR U 46, manufactured by Toray Industries, Inc.) having thickness of 100 μm by using a wire bar so that the thickness of a layer B after aging process becomes 20 μm. After the coating, it was dried for 1 min at 150° C. by using hot air dryer (that is, heating process). After that, it was subjected to heating (aging) for 14 days at 40° C. (that is, aging process) to obtain a multilayer polyester film. Layer B in the multilayer polyester film has average elongation at break of 82.5% at 80° C. to 150° C. When the obtained multilayer polyester film is used as a film for molding processing, no crack occurred in the layer B, and a good self-healing property was maintained.

Comparative ExampleS 13 to 17 and Examples 19 to 22

The multilayer polyester film was obtained in a similar manner as Example 18 except that the heating temperature and heating time for heating process are changed to the values given in Table 5. When the heating temperature is low or heating time is short, the layer B in the multilayer polyester film has average elongation at break of less than 65% at 80° C. to 150° C. Meanwhile, the layer B in the multilayer polyester film of Examples 13 to 17 has average elongation at break of 65% or more at 80° C. and 150° C. When the multilayer polyester film of Examples 13 to 17 is used as a film for molding processing, no crack occurred in the layer B, and a good self-healing property was maintained.

TABLE 5

|  |  | Example 18 | Comparative example 13 | Example 19 | Comparative example 14 | Example 20 | Example 21 | Comparative example 15 | Example 22 |
|---|---|---|---|---|---|---|---|---|---|
| Raw material for layer B |  | A9 | A9 | A9 | A9 | A9 | A9 | A9 | A9 |
| Content of particles(parts by mass) |  | 0 | 0 | 0 | 0 | 0 | 0 | 0 | 0 |
| Heating process | Heating temperature (° C.) | 150 | 150 | 160 | 160 | 160 | 170 | 170 | 170 |
|  | Heating time (minutes) | 1 | 0.5 | 1 | 0.5 | 2 | 1 | 0.5 | 2 |
| Aging process | Aging temperature (° C.) | 40 | 40 | 40 | 40 | 40 | 40 | 40 | 40 |
|  | Aging time(days) | 14 | 14 | 14 | 14 | 14 | 14 | 14 | 14 |
| Thickness of layer B(mm) |  | 20 | 20 | 20 | 20 | 20 | 20 | 20 | 20 |
| Elongation at break (%) | 25° C. | 125 | 115 | 140 | 105 | 160 | 155 | 115 | 165 |
|  | 80° C. | 105 | 90 | 115 | 80 | 130 | 120 | 80 | 135 |
|  | 100° C. | 85 | 70 | 90 | 70 | 105 | 100 | 65 | 105 |
|  | 125° C. | 75 | 50 | 75 | 60 | 90 | 90 | 55 | 95 |
|  | 150° C. | 65 | 40 | 65 | 40 | 80 | 80 | 45 | 85 |
| Average elongation at break at 80 to 150° C. (%) |  | 82.5 | 62.5 | 86.3 | 62.5 | 101.3 | 97.5 | 61.3 | 105 |
| Static coefficient of friction |  | 1< | 1< | 1< | 1< | 1< | 1< | 1< | 1< |
| Self-healing property(seconds) |  | 1> | 1> | 1> | 1> | 1> | 1> | 1> | 1> |
| Tackiness |  | Good | Good | Good | Slightly bad | Good | Good | Slightly bad | Good |
| Flatness |  | Good | Good | Good | Good | Good | Good | Good | Good |

Examples 23 to 30 and Comparative Examples 18 TO 22

The multilayer polyester film was obtained in a similar manner as Example 18 except that the aging temperature and aging time for aging process are changed to the values given in Table 5. When the aging temperature is low or aging time is short, the layer B in the multilayer polyester film has average elongation at break of less than 65% at 80° C. to 150° C. Meanwhile, when used as a film for molding processing, the film of Examples 23 to 30 showed no crack occurred in the layer B and maintained a good self-healing property.

TABLE 6

|  |  | Comparative example 16 | Comparative example 17 | Example 23 | Comparative example 18 | Comparative example 19 | Example 24 | Comparative example 20 | Example 25 |
|---|---|---|---|---|---|---|---|---|---|
| Raw material for layer B | | A9 | A9 | A9 | A9 | A9 | A9 | A9 | A9 |
| Content of particles(parts by mass) | | 0 | 0 | 0 | 0 | 0 | 0 | 0 | 0 |
| Heating process | Heating temperature (° C.) | 140 | 140 | 160 | 160 | 160 | 160 | 160 | 160 |
| | Heating time (minutes) | 1 | 5 | 2 | 2 | 2 | 2 | 2 | 2 |
| Aging process | Aging temperature (° C.) | 40 | 40 | 20 | 15 | 20 | 20 | 40 | 40 |
| | Aging time(days) | 14 | 14 | 3 | 3 | 2 | 20 | 1 | 3 |
| Thickness of layer B(mm) | | 20 | 20 | 20 | 20 | 20 | 20 | 20 | 20 |
| Elongation at break (%) | 25° C. | 105 | 115 | 120 | 110 | 105 | 145 | 115 | 125 |
| | 80° C. | 85 | 85 | 95 | 75 | 75 | 125 | 85 | 100 |
| | 100° C. | 60 | 65 | 80 | 60 | 60 | 100 | 65 | 85 |
| | 125° C. | 45 | 50 | 70 | 50 | 55 | 90 | 50 | 75 |
| | 150° C. | 35 | 40 | 60 | 35 | 45 | 75 | 40 | 65 |
| Average elongation at break at 80 to 150° C. (%) | | 56.3 | 60 | 76.3 | 55 | 58.8 | 97.5 | 60 | 81.3 |
| Static coefficient of friction | | 1< | 1< | 1< | 1< | 1< | 1< | 1< | 1< |
| Self-healing property(seconds) | | 1> | 1> | 1> | 1> | 1> | 1> | 1> | 1> |
| Tackiness | | Bad | Bad | Good | Good | Good | Good | Good | Good |
| Flatness | | Good | Good | Good | Good | Good | Good | Good | Good |

TABLE 7

|  |  | Example 26 | Comparative example 21 | Example 27 | Example 28 | Comparative example 22 | Example 29 | Example 30 |
|---|---|---|---|---|---|---|---|---|
| Raw material for layer B | | A9 | A9 | A9 | A9 | A9 | A9 | A9 |
| Content of particles(parts by mass) | | 0 | 0 | 0 | 0 | 0 | 0 | 0 |
| Heating process | Heating temperature (° C.) | 160 | 160 | 160 | 160 | 160 | 160 | 160 |
| | Heating time (minutes) | 2 | 2 | 2 | 2 | 2 | 2 | 2 |
| Aging process | Aging temperature (° C.) | 40 | 60 | 60 | 60 | 80 | 80 | 80 |
| | Aging time(days) | 20 | 1 | 3 | 7 | 1 | 3 | 7 |
| Thickness of layer B(mm) | | 20 | 20 | 20 | 20 | 20 | 20 | 20 |
| Elongation at break (%) | 25° C. | 165 | 115 | 135 | 155 | 115 | 140 | 165 |
| | 80° C. | 130 | 85 | 105 | 120 | 85 | 105 | 125 |
| | 100° C. | 105 | 65 | 85 | 95 | 70 | 85 | 100 |
| | 125° C. | 90 | 50 | 75 | 80 | 55 | 75 | 90 |
| | 150° C. | 75 | 40 | 65 | 70 | 40 | 70 | 85 |
| Average elongation at break at 80 to 150° C. (%) | | 100 | 60 | 82.5 | 91.3 | 62.5 | 100 | 100 |
| Static coefficient of friction | | 1< | 1< | 1< | 1< | 1< | 1< | 1< |
| Self-healing property(seconds) | | 1> | 1> | 1> | 1> | 1> | 1> | 1> |
| Tackiness | | Good | Good | Good | Good | Good | Good | Good |
| Flatness | | Good | Good | Good | Good | Good | Good | Good |

Example 31

The raw material A11 was coated on a polyester base film (trade name: LUMIRROR U 46, manufactured by Toray Industries, Inc.) having thickness of 100 μm by using a wire bar so that the thickness of a layer B after aging process becomes 20 μm. After the coating, it was dried for 2 min at 160° C. (that is, heating process). After that, it was subjected to heating (aging) for 14 days at 40° C. (that is, aging process) to obtain a multilayer polyester film. When the obtained multilayer polyester film is used as a film for molding processing, no crack occurred in the layer B, and a good self-healing property was maintained.

Example 32

The multilayer film was obtained in a similar manner as Example 31 except that thickness of the layer B after the aging process is changed to 10 μm. When the multilayer polyester film is used as a film for molding processing, no crack occurred in the layer B, and a good self-healing property was maintained.

Example 33

The multilayer film was obtained in a similar manner as Example 31 except that thickness of the layer B after the aging process is changed to 50 μm. When the multilayer polyester film is used as a film for molding processing, no crack occurred in the layer B, and a good self-healing property was maintained.

<Blending of Raw Material A14>

To 100 parts by mass of a mixture in which 75 parts by mass of the polydimethylsiloxane based block copolymer (a), 10 parts by mass of the polysiloxane (a), and 15 parts by mass of polycaprolactone triol having a hydroxy group (trade name: PRAXEL 308, manufactured by Daicel Corporation, weight average molecular weight 850) are blended (mixed), 25 parts by mass of the isocyanurate form of hexamethylene diisocyanate (trade name: TAKENATE D-170N, manufactured by Takeda Pharmaceutical Co., Ltd.) were added. With dilution by further using methyl ethyl ketone, the raw material having the solid matter concentration of 40% by mass was produced. Thereafter, by adding 5 parts by mass of silica sol (trade name: ORGANOSILICA SOL MEK-ST-ZL, manufactured by Nissan Chemical Industries, Ltd.) dispersed in methyl ethyl ketone, which has average particle diameter of from 70 to 100 nm, to 100 parts by mass of the solid matter of the raw material, the raw material A14 was prepared.

Example 34

The multilayer polyester film was obtained in a similar manner as Example 19 except that the raw material A14 is used instead of the raw material A9. When the obtained multilayer polyester film is used as a film for molding processing, no crack occurred in the layer B, and a good self-healing property was maintained.

<Blending of Raw Material A15>

The raw material A15 was obtained in a similar manner as the raw material A14 except that organosilica sol MEK-ST-ZL is used in an amount of 15 parts by mass.

Example 35

The multilayer polymer film was obtained in a similar manner as Example 19 except that the raw material A15 is used instead of the raw material A9. When the obtained multilayer polyester film is used as a film for molding processing, no crack occurred in the layer B, and a good self-healing property was maintained.

<Blending of Raw Material A16>

The raw material A16 was obtained in a similar manner as the raw material A14 except that organosilica sol MEK-ST-ZL is used in an amount of 30 parts by mass.

Example 37

The multilayer polymer film was obtained in a similar manner as Example 19 except that the raw material A16 is used instead of the raw material A9. When the obtained multilayer polyester film is used as a film for molding processing, no crack occurred in the layer B, and a good self-healing property was maintained.

TABLE 8

|  |  | Example 31 | Example 32 | Example 33 | Example 34 | Example 35 | Example 36 |
|---|---|---|---|---|---|---|---|
| Raw material for layer B | | A11 | A11 | A11 | A14 | A15 | A16 |
| Content of particles(parts by mass) | | 0 | 0 | 0 | 5 | 15 | 30 |
| Heating process | Heating temperature (° C.) | 160 | 160 | 160 | 160 | 160 | 160 |
| | Heating time (minutes) | 2 | 2 | 2 | 2 | 2 | 2 |
| Aging process | Aging temperature (° C.) | 40 | 40 | 40 | 40 | 40 | 40 |
| | Aging time(days) | 14 | 14 | 14 | 14 | 14 | 14 |
| Thickness of layer B(mm) | | 20 | 10 | 50 | 20 | 20 | 20 |
| Elongation at break (%) | 25° C. | 165 | 155 | 135 | 160 | 155 | 135 |
| | 80° C. | 120 | 130 | 95 | 125 | 110 | 90 |
| | 100° C. | 95 | 110 | 85 | 105 | 90 | 85 |
| | 125° C. | 85 | 95 | 75 | 95 | 80 | 80 |
| | 150° C. | 75 | 85 | 65 | 85 | 75 | 70 |
| Average elongation at break at 80 to 150° C. (%) | | 93.8 | 105 | 80 | 102.5 | 88.8 | 82.5 |
| Static coefficient of friction | | 1< | 1< | 1< | 0.85 | 0.74 | 0.66 |
| Self-healing property(seconds) | | 1> | 1.5 | 1> | 1> | 1> | 2 |
| Tackiness | | Good | Good | Good | Good | Good | Good |
| Flatness | | Good | Good | Good | Good | Good | Good |

The multilayer film of the invention can be used for applications which require the molding property and self-healing property simultaneously. In particular, it can be used as a film for decorated molding which is employed for a casing of a personal computer or a cellular phone.

The multilayer film of the invention can be prepared as a molded body by using a molding method like injection molding, pressure molding, vacuum molding, heat molding, and press molding. The multilayer film of the invention can be conformed to molding by deep drawing.

The invention claimed is:

1. A multilayer film comprising a layer B on at least one surface of a base film, wherein the layer B has a polycaprolactone segment and a urethane bond, and the layer B has average elongation at break of 65% or more at 80° C. to 150° C., wherein the layer B contains a polysiloxane segment and/or a polydimethylsiloxane segment, and wherein the base film has alternately 50 layers or more of each of a layer including polyester resin C in an amount of 50% by mass or more and 100% by mass or less (layer C) and a layer including polyester resin D in an amount of 50% by mass or more and 100% by mass or less (layer D).

2. The multilayer film according to claim 1, wherein the layer B has minimum elongation at break of 65% or more at 80° C. to 150° C.

3. A molded body using the multilayer film according to claim 1.

4. The molded body according to claim 3, wherein the molding magnification ratio of the multilayer film is from 1.1 to 1.6.

* * * * *